United States Patent
Nguyen et al.

(10) Patent No.: US 12,470,985 B2
(45) Date of Patent: Nov. 11, 2025

(54) COLLISION INDICATORS FOR SCI FORWARDING INFORMATION AND SCI FORWARDING TRIGGERING

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 17/648,077

(22) Filed: Jan. 14, 2022

(65) Prior Publication Data

US 2022/0232427 A1 Jul. 21, 2022

Related U.S. Application Data

(60) Provisional application No. 63/138,767, filed on Jan. 18, 2021.

(51) Int. Cl.
*H04W 28/26* (2009.01)
*H04L 5/00* (2006.01)
*H04L 5/16* (2006.01)
*H04W 72/25* (2023.01)
*H04W 72/40* (2023.01)

(52) U.S. Cl.
CPC .......... *H04W 28/26* (2013.01); *H04L 5/0007* (2013.01); *H04L 5/0064* (2013.01); *H04L 5/16* (2013.01); *H04W 72/25* (2023.01); *H04W 72/40* (2023.01)

(58) Field of Classification Search
CPC ..... H04W 28/26; H04W 72/56; H04W 72/20; H04W 72/40; H04W 72/25; H04L 5/0007; H04L 5/0064; H04L 5/16; H04L 5/0094
USPC ........................................................ 370/280
See application file for complete search history.

(56) References Cited

U.S. PATENT DOCUMENTS

| | | | |
|---|---|---|---|
| 2020/0068609 A1* | 2/2020 | Wang | H04W 72/02 |
| 2021/0051525 A1* | 2/2021 | Cao | H04W 28/26 |
| 2022/0322359 A1* | 10/2022 | Ye | H04W 72/563 |
| 2023/0362957 A1* | 11/2023 | Kalhan | H04W 72/20 |

* cited by examiner

Primary Examiner — Chae S Lee
(74) Attorney, Agent, or Firm — Procopio, Cory, Hargreaves & Savitch LLP

(57) ABSTRACT

Aspects presented herein relate to methods and devices for wireless communication of an apparatus, e.g., a UE. In one aspect, the apparatus may detect at least one conflict in a set of reserved resources between two or more sidelink (SL) resource reservations, each of the two or more SL resource reservations being associated with each of two or more UEs. The apparatus may also configure at least one of an indication of the at least one conflict or at least one resource reservation forwarding message. The apparatus may also transmit, after detecting the at least one conflict in the set of reserved resources, one or more of at least one resource reservation forwarding message or an indication of the at least one conflict.

33 Claims, 13 Drawing Sheets

COLLISION INDICATORS FOR SCI FORWARDING INFORMATION AND SCI FORWARDING TRIGGERING

CROSS REFERENCE TO RELATED APPLICATION(S)

This application claims the benefit of and priority to U.S. Provisional Application Ser. No. 63/138,767, entitled "METHODS AND APPARATUS FOR UTILIZING COLLISION INDICATORS FOR SCI FORWARDING INFORMATION AND SCI FORWARDING TRIGGERING" and filed on Jan. 18, 2021, which is expressly incorporated by reference herein in its entirety.

TECHNICAL FIELD

The present disclosure relates generally to communication systems, and more particularly, to resource reservation forwarding in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). In some aspects, the apparatus may detect at least one conflict in a set of reserved resources between two or more sidelink (SL) transmissions, each of the two or more SL transmissions being associated with each of two or more UEs. The apparatus may also configure at least one of the indication of the at least one conflict or the indication of the one or more resources. Additionally, the apparatus may transmit, upon detecting the at least one conflict in the set of reserved resources, at least one of an indication of the at least one conflict or an indication of one or more resources for a resource reservation forwarding process.

In an aspect of the disclosure, a method, a computer-readable medium, and an apparatus are provided. The apparatus may be a user equipment (UE). In some aspects, the apparatus may receive at least one of an indication of at least one conflict in a set of reserved resources between two or more sidelink (SL) transmissions or an indication of one or more resources for a resource reservation forwarding process, each of the two or more SL transmissions being associated with each of two or more UEs. The apparatus may also determine, based on a plurality of indications or messages received in an area, whether to transmit at least one resource reservation forwarding message of the resource reservation forwarding process, the plurality of indications or messages including at least one of the indication of the at least one conflict or the indication of the one or more resources. Additionally, the apparatus may calculate an amount of the plurality of indications or messages received in the area. The apparatus may also measure a reference signal received power (RSRP) of each of the plurality of indications or messages received within the area. The apparatus may also transmit, upon determining to transmit the at least one resource reservation forwarding message, the at least one resource reservation forwarding message. Further, the apparatus may cancel, upon determining to not transmit the at least one resource reservation forwarding message, a transmission of the at least one resource reservation forwarding message.

In an aspect of the disclosure, a method, a computer-readable medium, and an apparatus are provided. The apparatus may be a user equipment (UE). In some aspects, the apparatus may receive at least one of an indication of at least one conflict in a set of reserved resources between two or more sidelink (SL) transmissions or an indication of one or more resources for a resource reservation forwarding process, each of the two or more SL transmissions being associated with each of two or more UEs. The apparatus may also transmit, to at least one second UE, a request for at least one resource reservation forwarding message of the resource reservation forwarding process, the request indicating to the at least one second UE to transmit the at least one resource reservation forwarding message. Moreover, the apparatus may receive, based on the transmitted request, the at least one resource reservation forwarding message.

In an aspect of the disclosure, a method, a computer-readable medium, and an apparatus are provided. The apparatus may be a user equipment (UE). In some aspects, the apparatus may receive a request for at least one resource reservation forwarding message of a resource reservation forwarding process for one or more resources, the request indicating to transmit the at least one resource reservation forwarding message. The apparatus may also determine, based on the request, whether to transmit the at least one resource reservation forwarding message. Additionally, the apparatus may transmit, upon determining to transmit the at least one resource reservation forwarding message, the at least one resource reservation forwarding message. The apparatus may also cancel, upon determining to not transmit the at least one resource reservation forwarding message, a transmission of the at least one resource reservation forwarding message for the one or more resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
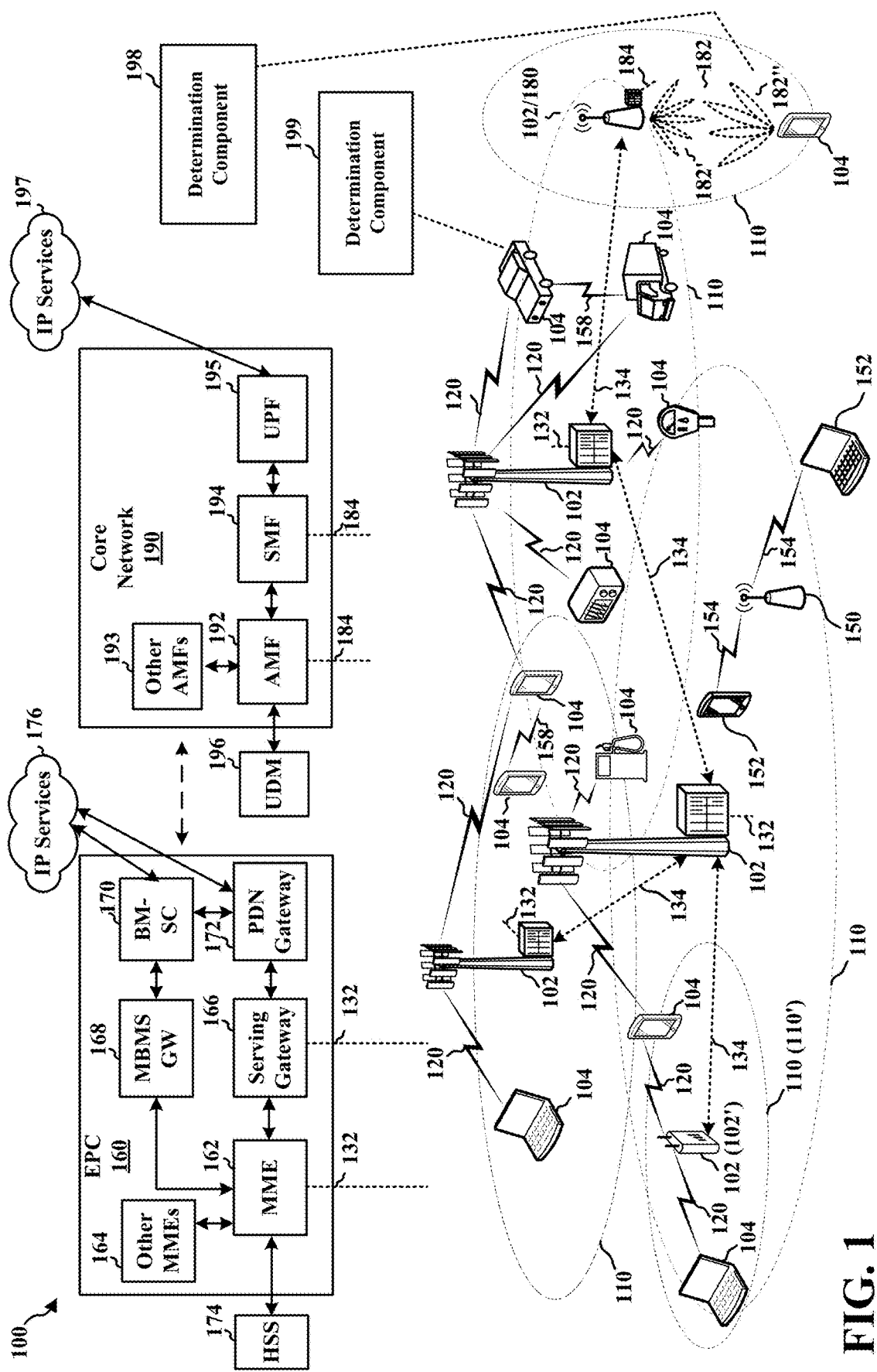
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to detect at least one conflict in a set of reserved resources between two or more sidelink (SL) resource reservations, each of the two or more SL resource reservations being associated with each of two or more UEs. Determination component 198 may also be configured to configure at least one of the indication of the at least one conflict or at least one resource reservation forwarding message. Determination component 198 may also be configured to transmit, upon detecting the at least one conflict in the set of reserved resources, one or more of an indication of the at least one conflict or at least one resource reservation forwarding message for a resource reservation forwarding process. In some aspects, determination component 198 may also be configured to receive a request for at least one resource reservation forwarding message of a resource reservation forwarding process for one or more resources, the request indicating to transmit the at least one resource reservation forwarding message. Determination component 198 may also be configured to determine, based on the request, whether to transmit the at least one resource reservation forwarding message. Determination component 198 may also be configured to transmit, upon determining to transmit the at least one resource reservation forwarding message, the at least one resource reservation forwarding message. Determination component 198 may also be configured to cancel, upon determining to not transmit the at least one resource reservation forwarding message, a transmission of the at least one resource reservation forwarding message for the one or more resources.

Referring again to FIG. 1, in certain aspects, the UE 104 may include a determination component 199 configured to receive at least one of an indication of at least one conflict in a set of reserved resources between two or more sidelink (SL) resource reservations, each of the two or more SL resource reservations being associated with each of two or more UEs. Determination component 199 may also be configured to determine, based on a plurality of indications or messages received in an area, whether to transmit at least one resource reservation forwarding message of the resource reservation forwarding process, the plurality of indications or messages including at least one of the indication of the at least one. Determination component 199 may also be configured to calculate an amount of the plurality of indications or messages received in the area. Determination component 199 may also be configured to measure a reference signal received power (RSRP) of each of the plurality of indications or messages received within the area. Determination component 199 may also be configured to transmit, upon determining to transmit the at least one resource reservation forwarding message, the at least one resource reservation forwarding message. Determination component 199 may also be configured to cancel, upon determining to not transmit the at least one resource reservation forwarding message, a transmission of the at least one resource reservation forwarding message. In some aspects, determination component 199 may also be configured to receive at least one of an indication of at least one conflict in a set of reserved resources between two or more sidelink (SL) resource reservations, each of the two or more SL resource reservations being associated with each of two or more UEs. Determination component 199 may also be configured to transmit, to at least one second UE, a request for at least one resource reservation forwarding message of the resource reservation forwarding process, the request indicating to the at least one second UE to transmit the at least one resource reservation forwarding message. Determination component 199 may also be configured to receive, based on the transmitted request, the at least one resource reservation forwarding message.

Although the following description may be focused on 5G NR, the concepts described herein may be applicable to other similar areas, such as LTE, LTE-A, CDMA, GSM, and other wireless technologies.

Figure 2:
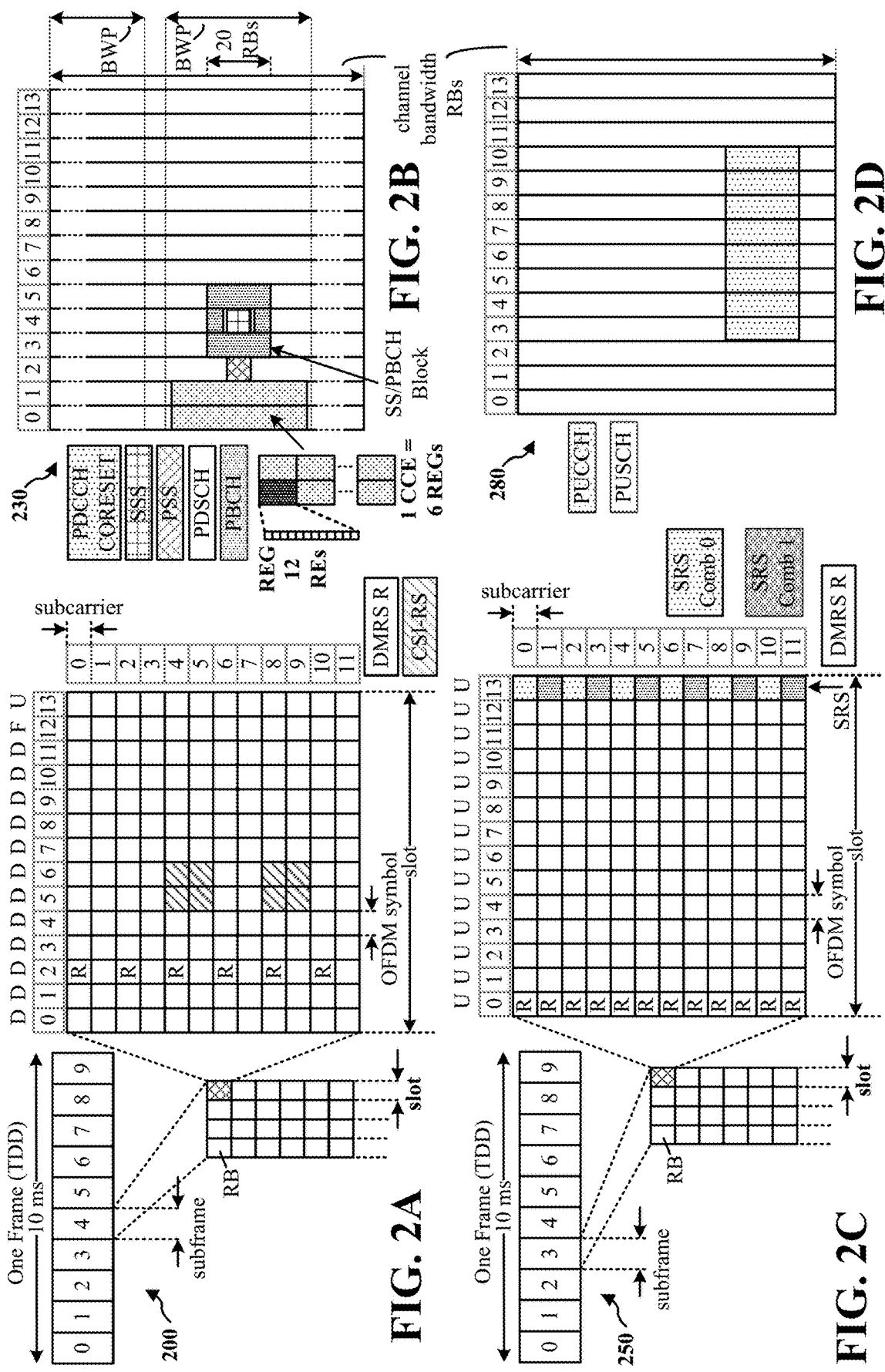
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
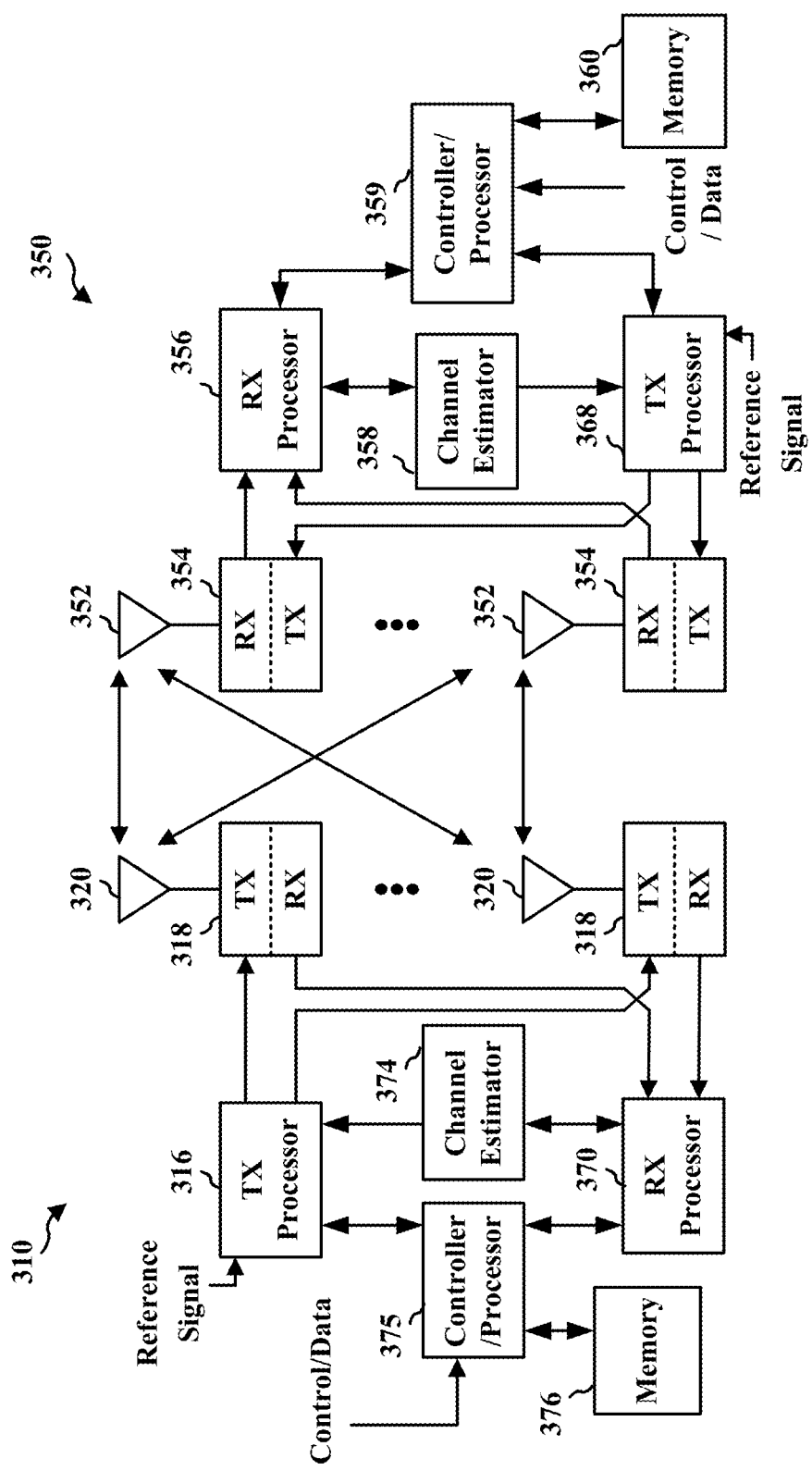
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

In some aspects of wireless communications, e.g., 5G NR, SL communication resource allocations may or may not be centrally controlled. For instance, each UE may autonomously allocate and reserve resources for particular communications based on information available to the UE and/or based on negotiation with other UEs. For example, some aspects of SL communication may perform inter-UE coordination in a certain mode, e.g., Mode 2, based on a set of resources sent by a first UE, e.g., UE-A, to a second UE, e.g., UE-B. In some aspects, inter-UE coordination may include the first UE (UE-A) sending, to the second UE (UE-B), a set of resources favored or specified for the second UE's transmission and a set of resources not favored for the second UE's transmission.

SL transmissions from different UEs may result in conflicting communications being received in a set of resources, e.g., a set of time and frequency resources defined by a time period and frequency range at a receiving UE. Inter-UE coordination, in some aspects, may include sensing or detecting resources reserved or used by other UEs and transmitting information regarding the sensing, e.g., information identifying the resources reserved or used for transmissions for other UEs. The inter-UE coordination may also include detecting or identifying conflicts between transmissions from different UEs and transmitting an indication of the detected conflicts to at least one of the UEs associated with the detected conflict. It may be beneficial to include details of the resource conflict. For example, it may be beneficial to identify the type of the resource conflict, e.g., high priority traffic conflict, recurring SPS conflicts, etc. It may further be beneficial to specify a sensing operation for a first UE (UE-A) engaged in inter-UE coordination and/or to specify which type of resource set information is beneficial to particular cast type.

It may also be beneficial to specify (1) how a UE engaged in inter-UE coordination will determine a set of favored and not-favored resources, (2) when, and by which UE, the information regarding the favored and not-favored resources is sent, and (3) how to determine the UE pair to be engaged in inter-UE coordination. There may be further benefit by specifying (1) how a first UE engaged in inter-UE coordination transmits a determined set of (favored or not-favored) resources including a container used to carry the information (implicitly and/or explicitly), (2) how a second UE receives the identified set of (favored or not-favored) resources and uses the information regarding the identified set of resources when performing resource selection for its own transmissions, and (3) how, or whether, to define the relationship between support/signalling of inter-UE coordination and cast type.

Figure 4:
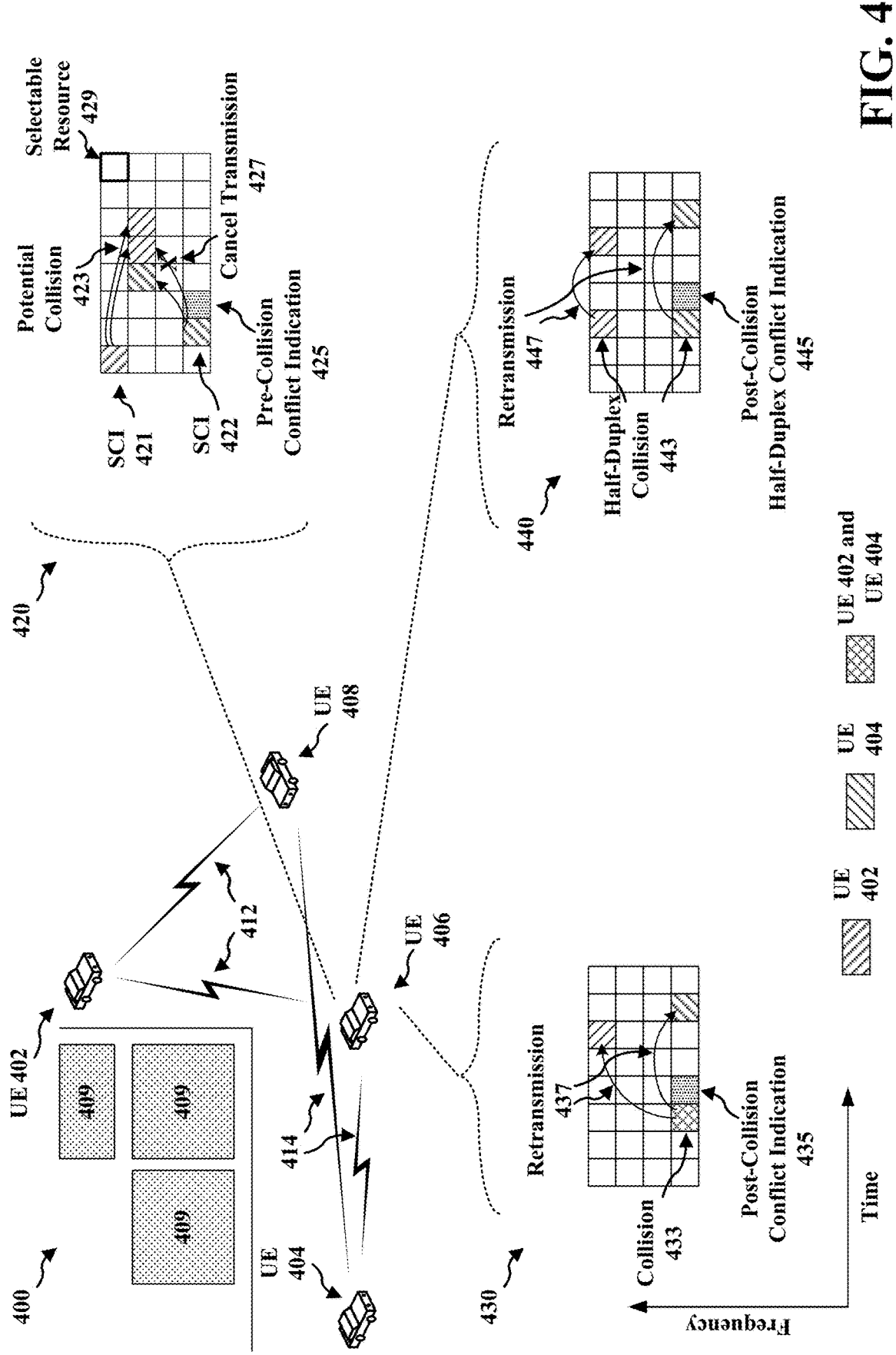
FIG. 4 is a diagram illustrating an example of a set of UEs associated with a conflict between transmissions from different UEs.

FIG. 4 includes a diagram 400 illustrating an example of a set of UEs 402-406 associated with a conflict between transmissions from different UEs. Diagram 400 illustrates a set of UEs (vehicles UE 402-UE 408) associated with a conflict between transmission of UE 402 and UE 404. In the example of diagram 400, direct communication between UE 402 and UE 404 is blocked by obstructions 409 (e.g., buildings) (e.g., UE 402 is a hidden node for UE 404 and UE 404 is a hidden node for UE 402). However, in the example of FIG. 4, UE 402 and UE 404 both transmit transmissions 412 and 414 that are received by UE 406 and/or UE 408 (or other UEs not shown). Additionally, UE 406 may determine that the transmissions 412 and 414 of UE 402 and UE 404, respectively, are either relevant to at least one other UE (e.g., UE 406, UE 408, or other UEs within a certain distance) or to each other to determine that the conflict should be addressed.

Diagrams 420-440 illustrate examples of conflicting (or colliding) transmissions 412 and 414 received from UE 402 and UE 404. Diagram 420 illustrates that UE 406 may receive sidelink control information (SCI) 421 and 422 transmitted by UE 402 and UE 404, respectively. Each grid of diagrams 420-440 represents a resource grid. As illustrated each block is identified as a selectable resource 429, such as time-and-frequency resources or a set of REs (e.g., a subchannel, an RB, or some other grouping of resources). The SCI 421 and 422 transmitted by UE 402 and UE 404, as shown, each include resource reservation information for two reserved time-and-frequency resources including a set of time-and-frequency resources overlapping in time and frequency (e.g., in the selectable resources identified as a potential collision 423). As will be discussed below in relation to diagram 440, a conflict between SL transmissions for UEs performing half-duplex communication may be based on resource reservation information for a set of time-and-frequency resources overlapping in time but not frequency that may be included in SCI transmitted by UE 402 and UE 404 (not shown).

Based on the SCI 421 and 422, UE 406 may detect the potential collision 423 before UE 402 and UE 404 transmit the data in the overlapping set of time-and-frequency resources. In some instances, the detection may include determining that the transmissions from UE 402 and UE 404 are configured to result in non-recurring conflicts. In this context "non-recurring" may refer to transmissions that are configured to not result in at least one of (1) a number of conflicts over a period of time that is above a threshold number of conflicts or (2) conflicts with a periodicity that is below a threshold periodicity (e.g., SCI 421 and 422 include per-packet scheduling information, or information regarding different SPS configurations used by UE 402 and UE 404 that have periodicities that do not sync with low enough periodicity). Based on different periodicities of different configurations, different numbers of collisions may be expected within a time period. The time period may be measured in seconds, milliseconds, microseconds, frames, slots, symbols, or any other measure of time selected in the future. Certain configurations may experience a number of conflicts during a period of time that is above a threshold number of conflicts or experience conflict with a periodicity that is below a threshold. Also, certain configurations may experience a number of conflicts during the same period of time that is below the threshold number of conflicts or experience conflict with a periodicity that is greater than the threshold.

In some aspects, the detection may also include measuring at least one of a reference signal received power (RSRP) for each of the transmissions 412 and 414 from UE 402 and UE 404, respectively, or measuring a reference signal received quality (RSRQ) for at least one of the transmissions 412 and 414 from UE 402 and UE 404.

Based on the detected potential conflict, UE 406 may transmit, to at least one of UE 402 and UE 404, a pre-collision conflict indication 425. The pre-collision conflict indication 425 may be transmitted to UE 404 and may include information regarding the resources reserved by UE 402 (e.g., the reserved resources or at least the overlapping resources). UE 404 may receive the pre-collision conflict indication 425 and determine to cancel the transmission 427 in the set of time-and-frequency resources overlapping with the transmission from UE 402 (e.g., in the time-and-frequency resource identified as a potential collision 423). The data meant to be transmitted during the set of overlapping resources may then be transmitted based on per-packet scheduling.

Diagram 430 illustrates that UE 406 may receive conflicting (colliding) transmissions at a time-and-frequency resource identified as including a collision 433. Based on receiving the conflicting (colliding) transmissions, UE 406 may transmit a post-collision conflict indication 435. The post-collision conflict indication 435 may be transmitted to one or more UEs, e.g., UE 402 and UE 404, and may include information indicating that at least one UE, e.g., UE 406, was unable to decode the transmission received at the resource identified as including a collision, e.g., collision 433. For instance, one or more UEs, e.g., UE 402 and UE 404, may receive the post-collision conflict indication 435 and determine to re-transmit 437 the colliding transmissions. Since the re-transmission resource is selected by each of the UEs, e.g., UE 402 and UE 404, based on different information or input (e.g., a randomly generated value or a UE-specific value) it is unlikely for there to be a subsequent collision, but in the event that a collision occurs on the re-transmission, the same process may be repeated. In one example, as shown in FIG. 4, UE 402 may want to communicate with UE 408. In this example, UE 406 may observe that a transmission from UE 404 is colliding with a transmission from UE 402, which may prevent UE 408 from receiving the transmission from UE 402. Based on this observation, UE 406 may send a collision notification to UE 402 and/or UE 404.

Diagram 440 illustrates that UE 406 may receive conflicting (colliding) transmissions at different resources time-and-frequency at a same time, the conflicting resources identified as including a half-duplex collision 443. The conflict illustrated in diagram 440 is based on an overlap in transmission time that prevents UE 402 from receiving the transmission from UE 404 and prevents UE 404 from receiving the transmission from UE 402 (e.g., because they are operating in a half-duplex mode). Based on receiving transmissions associated with the half-duplex collision 443 (i.e., conflicting transmissions), UE 406 may transmit a post-collision half-duplex conflict indication 445. The post-collision half-duplex conflict indication 445 may be transmitted to UE 402 and UE 404. UE 402 and UE 404 may receive the post-collision half-duplex conflict indication 445 and determine to re-transmit 447 the colliding transmissions. Since the re-transmission resource is selected by each of UE 402 and UE 404 based on different information or input (e.g., a randomly generated value, or a UE-specific value) it may be unlikely for there to be a subsequent collision, but in the event that a collision occurs on the re-transmission, the same process may be repeated.

In some aspects of SL communication, certain indicators, e.g., previous collision (post-collision) indicators and/or half-duplex indicators, may not be utilized in a resource selection procedure. For instance, these types of indicators may not be utilized as these indicators may trigger retransmission. In some instances, if certain information is utilized, this information may be used in a resource selection procedure. For example, if certain types of control signaling, such as sidelink control information (SCI) (e.g., SCI1 and SCI2), a physical sidelink feedback channel (PSFCH), and/or a MAC-CE, are utilized to convey information, this information may be used in a resource selection procedure.

Additionally, one manner in which to utilize indicators in a resource selection procedure is to use the indicators as part of a resource reservation forwarding process. In these instances, certain resource reservations may be forwarded to other transmitters in the system. For instance, post-collision indicators may trigger retransmission at an intended transmitter. Moreover, post-collision indicators may include, or separately send, the resource reserved for the transmission, e.g., by the intended transmitter. Also, hidden node interferers may use this information to avoid transmitting on the reserved resource.

Additionally, in some aspects, previous collision (post-collision) indicators may be used as a triggering condition for forwarding resource reservations. These indicators may be used as a triggering condition in a certain area, e.g., a local area. In some instances, frequent post-collision messaging in a certain area may indicate a high amount of hidden nodes in the area, i.e., a hidden node hot-spot. As indicated herein, post-collision indicators may be used as a trigger for retransmissions. This may be due to the utilization of certain types of channels, e.g., a physical sidelink feedback channel (PSFCH). Further, different types of UEs may benefit from using certain indicators, e.g., pre-collision and/or post-collision indicators, as a trigger for retransmissions.

In some instances, when a retransmission occurs, there may be no guarantee that the collision will not occur again. For example, in a hidden node setting, each of multiple hidden nodes may not be aware of other hidden nodes. As such, each hidden node may not be aware of retransmissions from another hidden node. Based on this, it may be beneficial if retransmission resources are forwarded to other nodes or UEs, so that these nodes or UEs may be aware of any upcoming retransmissions from other nodes or UEs, e.g., hidden nodes or hidden UEs.

Some aspects of SL communication may trigger or initiate a resource reservation forwarding process or a resource reservation forwarding mechanism. For instance, resource reservation forwarding may allow a transmitter or transmitting UE to be aware of a hidden node before making an initial transmission. As such, an initial collision within certain resources may be avoided based on the resource reservation forwarding process. In some instances, enabling resource reservation forwarding may result in an increased resource consumption. Additionally, in half-duplex SL communication, a forwarding UE may not be able to receive other data during the resource reservation forwarding process. In some aspects, enabling resource reservation forwarding may be beneficial in a certain setting, e.g., a setting with a prevalence for hidden nodes. For example, this type of setting may be located in certain areas, e.g., near a road crossing or tall buildings.

Based on the above, it may be beneficial to utilize certain types of indicators in SL communication. For instance, it may be beneficial to utilize certain types of indicators to protect retransmissions in SL communication. It may also be beneficial to utilize certain indicators to initiate or trigger a resource reservation forwarding process. Further, it may be beneficial to utilize certain indicators as resource reservation forwarding information.

Aspects of the present disclosure may utilize certain indicators to provide an indication of retransmissions in SL communication, such as SL transmission conflict indicators, e.g., previous collision (post-collision) indicators, half-duplex indicators, and/or subsequent collision (pre-collision) indicators. These SL transmission conflict indicators may preserve or protect retransmissions in SL communication, such as when two transmitting UEs are unaware of each other. Aspects of the present disclosure may also utilize certain indicators, e.g., post-collision indicators and/or half-duplex indicators, in order to initiate or trigger a resource reservation forwarding process. For instance, aspects of the present disclosure may utilize indicators, e.g., post-collision indicators and/or half-duplex indicators, as resource reservation forwarding information. Moreover, aspects of the present disclosure may utilize other types of indicators, e.g., pre-collision indicators, to protect retransmissions to initiate a resource reservation forwarding process, or as resource reservation forwarding information.

In some aspects of the present disclosure, certain types of conflict indicators for SL transmission, e.g., post-collision indicators and/or half-duplex indicators, may include the types of resources reserved for SL transmissions, e.g., transmissions by the intended transmitter or transmitting UE. Also, certain types of conflict indicators for SL transmission, e.g., post-collision indicators and/or half-duplex indicators, may separately send a list of resources reserved for SL transmissions. Hidden node interferers or interfering UEs may utilize this information to avoid transmitting on the reserved resources.

As indicated above, in some aspects of the present disclosure, SL transmission conflict indicators, e.g., post-collision indicators and/or half-duplex indicators, may indicate the resources reserved for the SL transmission. In these instances, a transmitter or transmitting UE may indicate the resources for a post-collision indicator message. Additionally, resources for certain types of indicators, e.g., post-collision indicators and/or half-duplex indicators, may be mapped, i.e., one-to-one mapped, to a transmission or transmission packet. For example, this mapping may be based on the resources of the SL transmission, UE identifiers (IDs), and/or a hashing or cyclic redundancy check (CRC) of a control channel, e.g., a first control channel (CCH1) or a second control channel (CCH2). Further, each UE that transmits an indicator may send the same information in the same resource. By doing so, this may reduce a resource consumption. Moreover, this may also create a single frequency network (SFN) effect and/or increase the reliability of SL communication.

In some instances, certain types of indicators, e.g., post-collision indicators and/or half-duplex indicators, may separately indicate the resources reserved for the SL transmission. For instance, a first type of indicators, e.g., first post-collision indicators and/or first half-duplex indicators, may be transmitted as part of an ACK/NACK feedback. Additionally, a second type of indicators, e.g., second post-collision indicators and/or second half-duplex indicators, may be transmitted in a similar fashion.

In some aspects of the present disclosure, certain types of indicators, e.g., post-collision indicators and/or half-duplex indicators, may initiate or trigger a resource reservation forwarding process, such as with a resource reservation forwarding mechanism. In some instances, the resource reservation forwarding process may be based on a triggering area, i.e., local area triggering. In these instances, each receiver or receiving UE may determine or calculate the number of indications or messages, e.g., post-collision and/or half-duplex indications or messages, that the UE receives in an area. This may be performed based on transmitter location zone information. Additionally, this may be performed by measuring a RSRP of the indications or messages, e.g., post-collision messages and/or half-duplex messages. For instance, a higher RSRP may indicate that the message is from a transmitter in the same area. Also, a higher RSRP may be associated with a reception time of the message. Also, a UE may calculate or determine an amount of certain types of messages, such as messages that have an RSRP higher than a threshold.

In some instances, if the number of messages, e.g., post-collision and/or half-duplex messages, received over a time period, e.g., time period T1, is greater than a threshold, e.g., limit L1, the UE may trigger or start the resource reservation forwarding process. Also, if the number of messages, e.g., post-collision and/or half-duplex messages, over a time period, e.g., time period T2, is less than a threshold, e.g., limit L2, the UE may cancel or stop the resource reservation forwarding process. In some instances, a certain threshold, e.g., limit L1, may be larger than another threshold, e.g., limit L2. Further, there may be a hysteresis to avoid oscillating back-and-forth between two different states.

In some aspects, the resource reservation forwarding process may be initiated or triggered by a transmitter or transmitting UE. For example, a transmitter may explicitly send an indication or message requesting at least one receiver in an area to forward resource reservations during a time period. This indication or message may be sent by itself, e.g., a stand-alone message, or be sent with corresponding data. For example, stand-alone triggering may be used before sending a first packet of the resource reservation forwarding process. If the transmitter does not have any traffic for a certain time period, i.e., the time period expires, the resource reservation forwarding process may be canceled or stopped.

In some aspects, the resource reservation forwarding process may be associated with at least one message, e.g., at least one resource reservation forwarding message, at least one inter-UE coordination message, or at least one subsequent SL transmission. Moreover, the at least one message, e.g., at least one resource reservation forwarding message, at least one inter-UE coordination message, or at least one subsequent SL transmission, may include a variety of information, such as conflict notification information and/or resource reservation forwarding information.

The manner in which the transmitter or transmitting UE determines to trigger the resource reservation forwarding may be based on a number of different scenarios, e.g., a UE implementation. In some instances, the transmitting UE may perform the determination based on a pre-collision indicator and/or a post-collision indicator. In these instances, after each pre-collision and/or post-collision indication, the UE may trigger resource reservation forwarding to itself for a certain time period. Also, after each subsequent pre-collision and/or post-collision indication, the UE may extend the duration of resource reservation forwarding. Additionally, the decision to extend the duration of resource reservation forwarding may be based on the content of the forwarded resource reservation. For example, if resource reservation forwarding information indicates to a UE, e.g., an interfering UE, that a transmitting UE is unaware of the interfering UE, then the resource reservation forwarding duration may be extended.

In some instances, a resource reservation forwarding process may be triggered or initiated for certain types of SL traffic, e.g., high priority SL traffic. Further, the resource reservation forwarding process may be periodically triggered for a period of time, e.g., a few seconds, in order to check for possible hidden nodes. Also, in some aspects, the resource reservation forwarding process may be maintained if a hidden node is detected. Otherwise, if a hidden node is not detected, the resource reservation forwarding process may be canceled or stopped.

In some aspects, during a pre-collision of a message, a UE may benefit from transmitting a next reservation message, e.g., a potentially-colliding message. So the transmission of a pre-collision message may trigger the resource reservation forwarding process. This may be similar to pre-collision filtering based on a number of factors, e.g., a zone ID, RSRP, etc. Additionally, a UE may separately determine a number of pre-collision messages and a number of post-collision messages. The UE may also apply separate thresholds for different types of messages, e.g., pre-collision messages and post-collision messages. Moreover, a UE may combine different type of messages and apply a single threshold.

Figure 5:
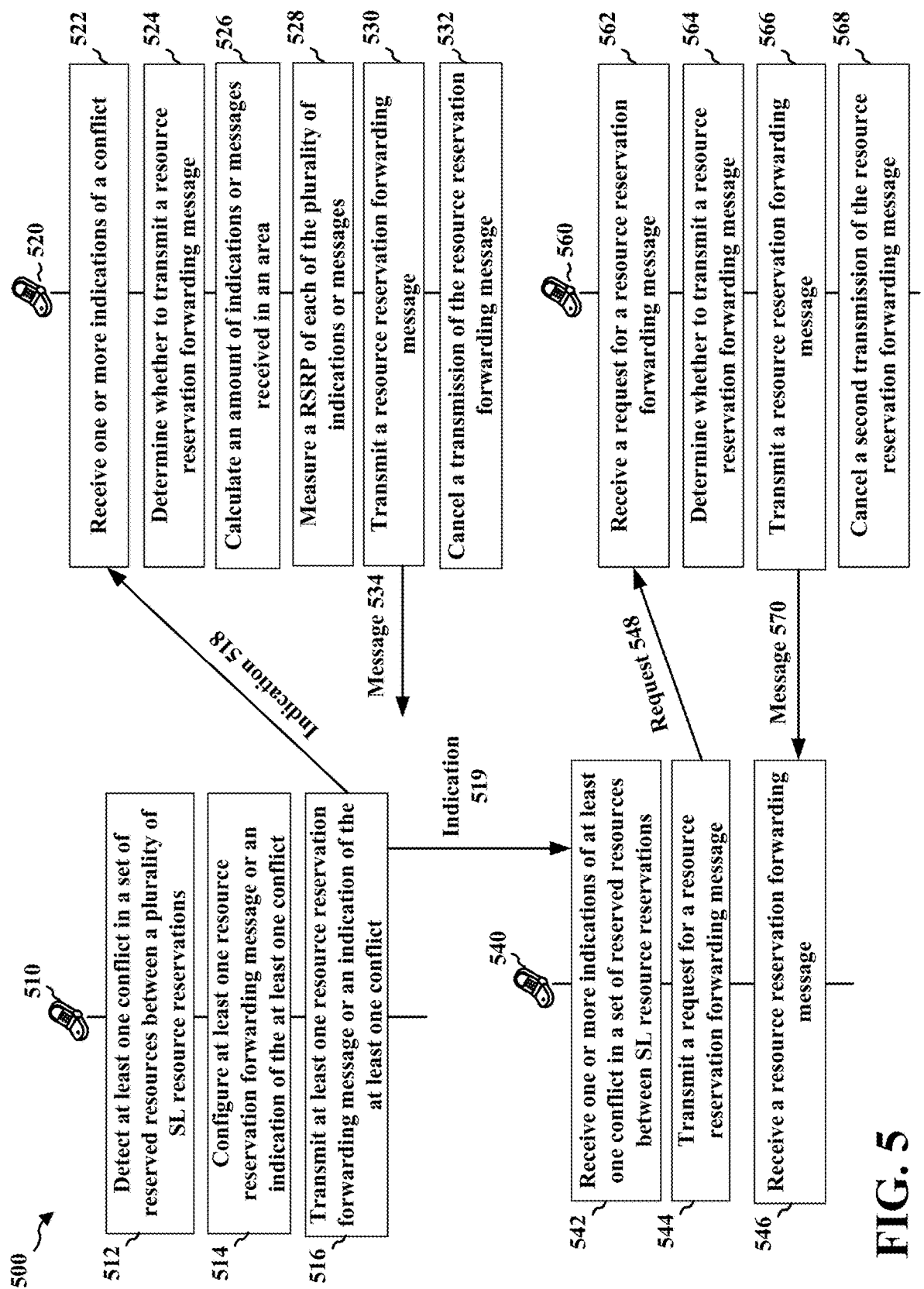
FIG. 5 is a diagram illustrating example communication between a UE and a base station.

FIG. 5 is a diagram 500 illustrating communication between multiple UEs, e.g., UE 510, UE 520, UE 540, and UE 560. The UEs 510/520/540/560 may correspond to UE 104, 350, 402/404/406, apparatus 1202, and apparatus 1302.

At 512, UE 510 may detect at least one conflict in a set of reserved resources between a plurality of sidelink (SL) resource reservations, each of the plurality of SL resource reservations being associated with a respective UE of a plurality of UEs. The at least one conflict may correspond to a first collision in the set of reserved resources, a first half-duplex collision in the set of reserved resources, or a second collision in the set of reserved resources, where the first collision in the set of reserved resources may occur before the second collision in the set of reserved resources. Further, the first half-duplex collision in the set of reserved resources may occur before the second collision in the set of reserved resources. Also, the resource reservation forwarding process for the one or more resources may be associated with at least one resource reservation forwarding message, at least one inter-UE coordination message, or at least one subsequent SL transmission. The at least one conflict may include at least one of a conflict in time or a conflict in time and frequency.

At 514, UE 510 may configure at least one of an indication of the at least one conflict or at least one resource reservation forwarding message, e.g., indication 518 and/or indication 519. At least one of the indication of the at least one conflict or at least one resource reservation forwarding message, e.g., indication 518 and/or indication 519, may trigger the resource reservation forwarding process. For instance, the resource reservation forwarding process may be triggered by the indication of the one or more resources or the indication of the at least one conflict. Also, the resource reservation forwarding process may be triggered by the detection of the at least one conflict in the set of reserved resources, or the resource reservation forwarding process may be triggered by the transmission of the one or more of the at least one resource reservation forwarding message or the indication of the at least one conflict. Additionally, the resource reservation forwarding process may be triggered if a number of post-collision messages or half-duplex messages received over a time period is greater than a threshold, or the resource reservation forwarding process may be canceled if the number of the post-collision messages or the half-duplex messages received over the time period is less than the threshold. Further, at least one of the indication of the at least one conflict or the indication of the one or more resources, e.g., indication 518 and/or indication 519, may be associated with an acknowledgement (ACK) or a negative ACK (NACK).

In some aspects, a set of resources for at least one of the indication of the at least one conflict or the indication of the one or more resources, e.g., indication 518 and/or indication 519, may be mapped to at least one transmission. Also, at least one resource reservation forwarding message of the resource reservation forwarding process may be transmitted via the one or more resources in the set of resources for at least one of the indication of the at least one conflict or the indication of the one or more resources. Also, UE 510 may transmit one or more resource reservation forwarding messages of the resource reservation forwarding process. Further, at least one of the indication of the at least one conflict or the at least one resource reservation forwarding message, e.g., indication 518 and/or indication 519, may be transmitted via one of sidelink control information (SCI), a physical sidelink feedback channel (PSFCH), a physical sidelink shared channel (PSSCH), or a medium access control (MAC) control element (MAC-CE).

At 516, UE 510 may transmit, after detecting the at least one conflict in the set of reserved resources, one or more of an indication of the at least one conflict or at least one resource reservation forwarding message of a resource reservation forwarding process, e.g., indication 518 and/or indication 519. For example, UE 510 may transmit indication 518 to UE 520 and/or may transmit indication 519 to UE 540.

At 522, UE 520 may receive, from at least one second UE, one or more indications of at least one conflict in a set of reserved resources between a plurality of sidelink (SL) resource reservations, e.g., indication 518, each of the plurality of SL resource reservations being associated with a respective UE of a plurality of UEs.

In some aspects, at least one of the indication of the at least one conflict, e.g., indication 518, may trigger the resource reservation forwarding process for the one or more resources or may cancel the resource reservation forwarding process for the one or more resources. Further, at least one of the indication of the at least one conflict or the indication of the one or more resources, e.g., indication 518, may be received via one of sidelink control information (SCI), a physical sidelink feedback channel (PSFCH), a physical sidelink shared channel (PSSCH), or a medium access control (MAC) control element (MAC-CE). The at least one conflict may include at least one of a conflict in time or a conflict in time and frequency. Also, the at least one conflict may correspond to a previous collision in the set of reserved resources, a previous half-duplex collision in the set of reserved resources, or a subsequent collision in the set of reserved resources.

At 524, UE 520 may determine, based on a plurality of indications or messages received in an area, whether to transmit at least one resource reservation forwarding message of the resource reservation forwarding process, e.g., message 534, the plurality of indications or messages including at least one of the indication of the at least one conflict, e.g., indication 518. The at least one resource reservation forwarding message, e.g., message 534, may be associated with at least one inter-UE coordination message or at least one subsequent SL transmission.

At 526, UE 520 may calculate an amount of the plurality of indications or messages received in the area. The at least one resource reservation forwarding message, e.g., message 534, may be transmitted if the amount of the plurality of indications or messages received over a first time period is greater than a first threshold. Also, the at least one resource reservation forwarding message, e.g., message 534, may not be transmitted if the amount of the plurality of indications or messages received over a second time period is less than a second threshold. The amount of the plurality of indications or messages may also be calculated based on transmission location information for each of the plurality of indications or messages.

At 528, UE 520 may measure a reference signal received power (RSRP) of each of the plurality of indications or messages received within the area. The calculated amount of the plurality of indications or messages may include each of the plurality of indications or messages with a RSRP greater than a threshold.

At 530, UE 520 may transmit the at least one resource reservation forwarding message, e.g., message 534, based on a plurality of indications or messages received in an area, the plurality of indications or messages including the at least one of the indication of the one or more resources.

At 532, UE 520 may cancel, upon determining to not transmit the at least one resource reservation forwarding message, a transmission of the at least one resource reservation forwarding message, e.g., message 534.

At 542, UE 540 may receive, from at least one second UE, one or more indications of at least one conflict in a set of reserved resources between a plurality of sidelink (SL) resource reservations, e.g., indication 519, each of the plurality of SL resource reservations being associated with a respective UE of a plurality of UEs. At least one of the indication of the at least one conflict or the indication of the one or more resources, e.g., indication 519, may be received via one of sidelink control information (SCI), a physical sidelink feedback channel (PSFCH), a physical sidelink shared channel (PSSCH), or a medium access control (MAC) control element (MAC-CE). The at least one conflict may correspond to a first collision in the set of reserved resources, a first half-duplex collision in the set of reserved resources, or a second collision in the set of reserved resources, where the first collision in the set of reserved resources occurs before the second collision in the set of reserved resources. Also, the at least one conflict may include at least one of a conflict in time or a conflict in time and frequency.

At 544, UE 540 may transmit, to at least one second UE, a request for at least one resource reservation forwarding message of a resource reservation forwarding process, e.g., request 548, the request indicating to the at least one second UE to transmit the at least one resource reservation forwarding message. The request, e.g., request 548, may trigger a transmission of the at least one resource reservation forwarding message or cancels the transmission of the at least one resource reservation forwarding message. Further, a second transmission of the at least one resource reservation forwarding message may be triggered by the request, or the second transmission of the at least one resource reservation forwarding message may be canceled by the request. Also, the request, e.g., request 548, may adjust a duration when the at least one second UE transmits the at least one resource reservation forwarding message. The request, e.g., request 548, may include a transmission configuration, where the at least one resource reservation forwarding message is received based on the transmission configuration of the request. In some instances, the UE (e.g., UE 540) may send back the request to the UE (e.g., UE 510) that sent the indication in the first place.

In some instances, the request, e.g., request 548, may be periodically transmitted to the at least one second UE based on a time period. The at least one resource reservation forwarding message may be received based on an expiration of the time period. Further, the request, e.g., request 548, may be transmitted to the at least one second UE based on priority of SL transmission traffic. The request, e.g., request 548, may be based on at least one of the indication of the at least one conflict or the indication of the one or more resources.

At 546, UE 540 may receive, based on the transmitted request, e.g., request 548, the at least one resource reservation forwarding message, e.g., message 570. The at least one resource reservation forwarding message, e.g., message 570, may be received based on a detection of at least one hidden node. Also, the request, e.g., request 548, may configure the at least one second UE, e.g., UE 560, to transmit the at least one resource reservation forwarding message, e.g., message 570. The at least one resource reservation forwarding message, e.g., message 570, may be at least one inter-UE coordination message. Further, the at least one resource reservation forwarding message (e.g., an inter-UE coordination message) may be a type of SL transmission. Moreover, the at least one resource reservation forwarding message, e.g., message 570, may be received via the one or more resources. Further, the at least one resource reservation forwarding message may be received via one of sidelink control information (SCI), a physical sidelink feedback channel (PSFCH), a physical sidelink shared channel (PSSCH), or a medium access control (MAC) control element (MAC-CE).

At 562, UE 560 may receive a request for at least one resource reservation forwarding message of a resource reservation forwarding process for one or more resources, e.g., request 548, the request indicating to transmit the at least one resource reservation forwarding message. The request, e.g., request 548, may trigger a transmission of the at least one resource reservation forwarding message or may cancel the transmission of the at least one resource reservation forwarding message. Further, a second transmission of the at least one resource reservation forwarding message may be triggered by the request, or the second transmission of the at least one resource reservation forwarding message may be canceled by the request. The request, e.g., request 548, may also adjust a duration when the at least one resource reservation forwarding message is transmitted. Further, the request, e.g., request 548, may include a transmission configuration, where the determination whether to transmit the at least one resource reservation forwarding message is based on the transmission configuration of the request.

In some aspects, the request, e.g., request 548, may be based on at least one of an indication of at least one conflict in a set of reserved resources between two or more sidelink (SL) resource reservations, each of the two or more SL resource reservations being associated with each of two or more UEs. The at least one conflict may correspond to a previous collision in the set of reserved resources, a previous half-duplex collision in the set of reserved resources, or a subsequent collision in the set of reserved resources. The at least one conflict may include at least one of a conflict in time or a conflict in time and frequency.

At 564, UE 560 may determine, based on the request, whether to transmit the at least one resource reservation forwarding message, e.g., message 570. The determination whether to transmit the at least one resource reservation forwarding message, e.g., message 570, may be based on an expiration of a time period. Also, the determination whether to transmit the at least one resource reservation forwarding message may be based on a priority of sidelink (SL) transmission traffic. The determination whether to transmit the at least one resource reservation forwarding message, e.g., message 570, may be based on a periodic reception of the request over a time period.

At 566, UE 560 may transmit, based on the request, the at least one resource reservation forwarding message, e.g., message 570. The at least one resource reservation forwarding message, e.g., message 570, may be transmitted based on a detection of at least one hidden node. Also, the at least one resource reservation forwarding message, e.g., message 570, may be associated with at least one inter-UE coordination message or at least one subsequent SL transmission.

At 568, UE 560 may cancel a second transmission of the at least one resource reservation forwarding message for the one or more resources, e.g., message 570, where the at least one resource reservation forwarding message may be transmitted before the second transmission of the at least one resource reservation forwarding message is canceled.

Figure 6:
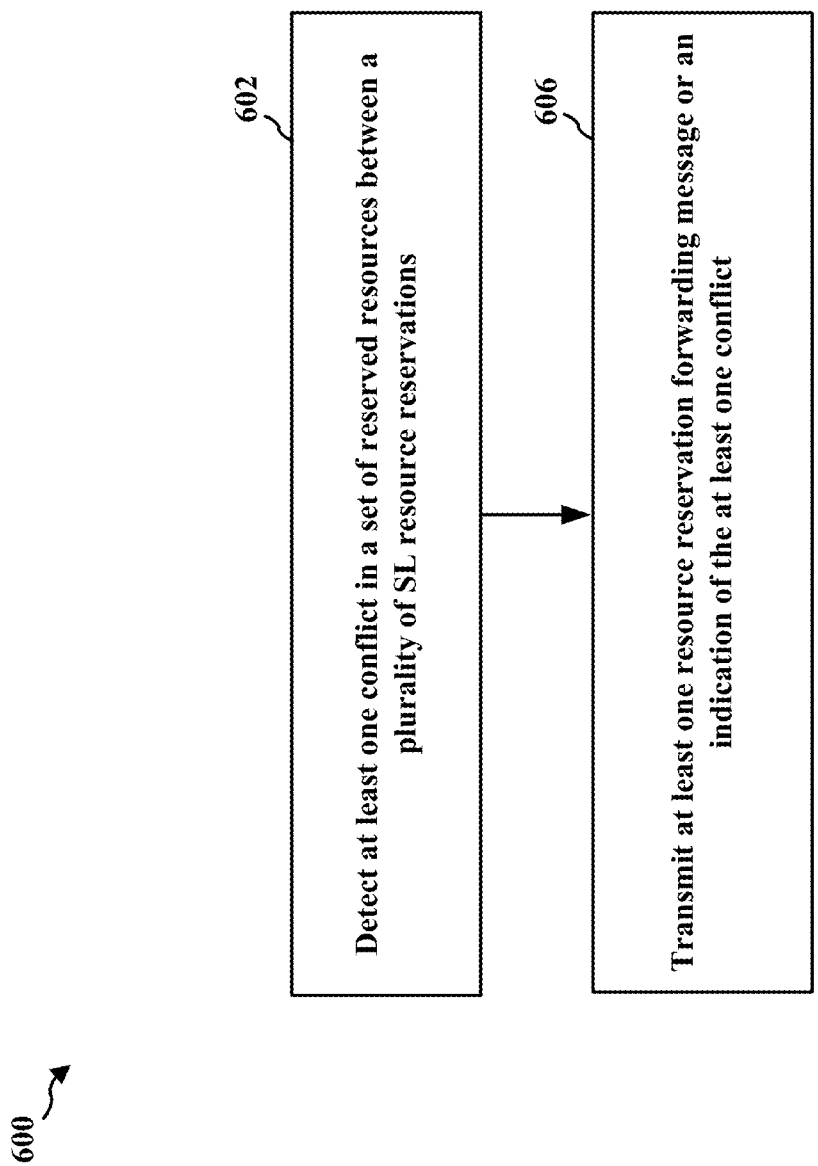
FIG. 6 is a flowchart of a method of wireless communication.

FIG. 6 is a flowchart 600 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 602, the apparatus may detect at least one conflict in a set of reserved resources between a plurality of sidelink (SL) resource reservations, each of the plurality of SL resource reservations being associated with a respective UE of a plurality of UEs, as described in connection with the examples in FIGS. 4-5. For example, as described in 512 of FIG. 5, UE 510 may detect at least one conflict in a set of reserved resources between a plurality of sidelink (SL) resource reservations, each of the plurality of SL resource reservations being associated with a respective UE of a plurality of UEs. Further, 602 may be performed by determination component 1240 in FIG. 12.

In some instances, the at least one conflict may correspond to a first collision in the set of reserved resources, a first half-duplex collision in the set of reserved resources, or a second collision in the set of reserved resources, where the first collision in the set of reserved resources may occur before the second collision in the set of reserved resources, as described in connection with the examples in FIGS. 4-5. Also, the resource reservation forwarding process for the one or more resources may be associated with at least one resource reservation forwarding message, at least one inter-UE coordination message, or at least one subsequent SL transmission, as described in connection with the examples in FIGS. 4-5. The at least one conflict may include at least one of a conflict in time or a conflict in time and frequency, as described in connection with the examples in FIGS. 4-5.

In some aspects, a set of resources for at least one of the indication of the at least one conflict or the indication of the one or more resources may be mapped to at least one transmission, as described in connection with the examples in FIGS. 4-5. Also, at least one resource reservation forwarding message of the resource reservation forwarding process may be transmitted, as described in connection with the examples in FIGS. 4-5. Further, at least one of the indication of the at least one conflict or the indication of the one or more resources may be transmitted via one of sidelink control information (SCI), a physical sidelink feedback channel (PSFCH), a physical sidelink shared channel (PSSCH), or a medium access control (MAC) control element (MAC-CE), as described in connection with the examples in FIGS. 4-5.

At 606, the apparatus may transmit, after detecting the at least one conflict in the set of reserved resources, one or more of an indication of the at least one conflict or at least one resource reservation forwarding message of a resource reservation forwarding process, as described in connection with the examples in FIGS. 4-5. For example, as described in 516 of FIG. 5, UE 510 may transmit, upon detecting the at least one conflict in the set of reserved resources, at least one of an indication of the at least one conflict or at least one resource reservation forwarding message. Further, 606 may be performed by determination component 1240 in FIG. 12. For instance, the apparatus may transmit the indications to multiple UEs, as described in connection with the examples in FIGS. 4-5. The resource reservation forwarding process may be triggered by the detection of the at least one conflict in the set of reserved resources, or the resource reservation forwarding process may be triggered by the transmission of the one or more of the at least one resource reservation forwarding message or the indication of the at least one conflict.

Figure 7:
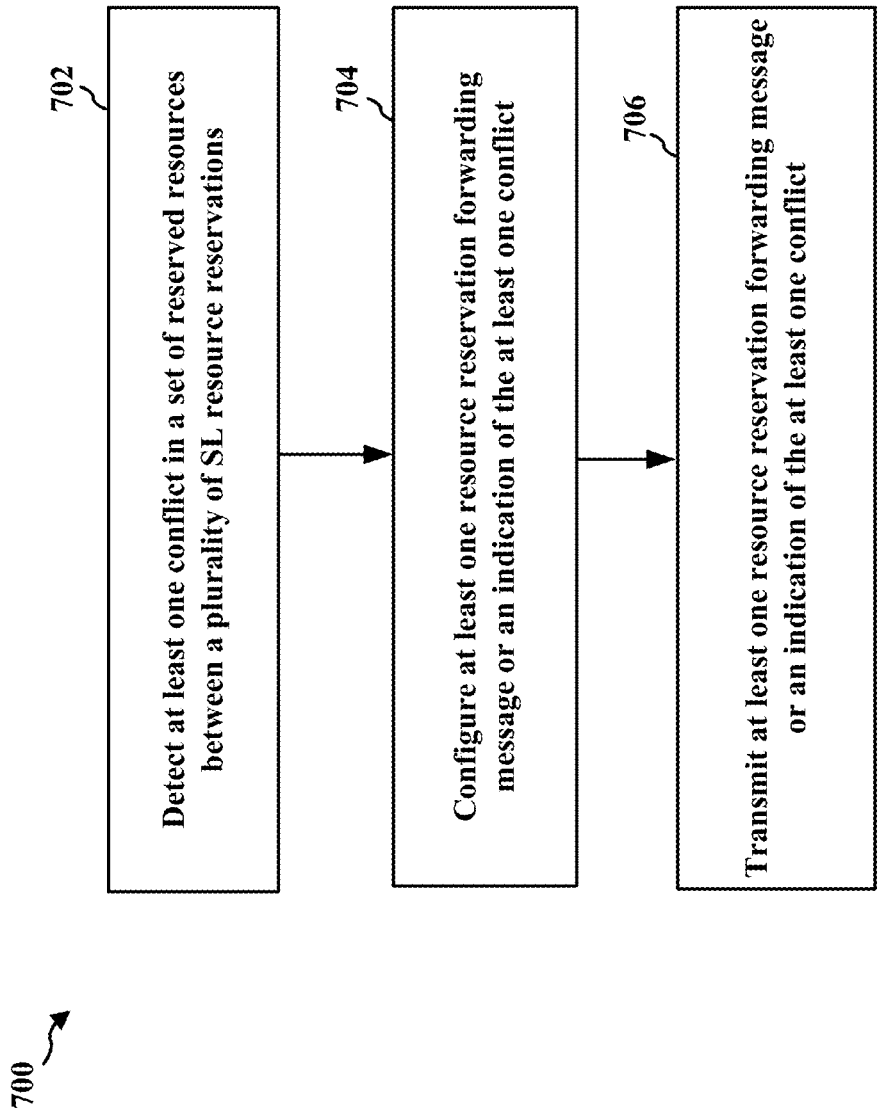
FIG. 7 is a flowchart of a method of wireless communication.

FIG. 7 is a flowchart 700 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 702, the apparatus may detect at least one conflict in a set of reserved resources between a plurality of sidelink (SL) resource reservations, each of the plurality of SL resource reservations being associated with a respective UE of a plurality of UEs, as described in connection with the examples in FIGS. 4-5. For example, as described in 512 of FIG. 5, UE 510 may detect at least one conflict in a set of reserved resources between a plurality of sidelink (SL) resource reservations, each of the plurality of SL resource reservations being associated with a respective UE of a plurality of UEs. Further, 702 may be performed by determination component 1240 in FIG. 12.

In some instances, the at least one conflict may correspond to a first collision in the set of reserved resources, a first half-duplex collision in the set of reserved resources, or a second collision in the set of reserved resources, where the first collision in the set of reserved resources may occur before the second collision in the set of reserved resources, as described in connection with the examples in FIGS. 4-5. Also, the resource reservation forwarding process may be associated with at least one resource reservation forwarding message, at least one inter-UE coordination message, or at least one subsequent SL transmission, as described in connection with the examples in FIGS. 4-5. The at least one conflict may include at least one of a conflict in time or a conflict in time and frequency, as described in connection with the examples in FIGS. 4-5.

At 704, the apparatus may configure at least one of an indication of the at least one conflict or at least one resource reservation forwarding message, as described in connection with the examples in FIGS. 4-5. For example, as described in 514 of FIG. 5, UE 510 may configure at least one of an indication of the at least one conflict or at least one resource reservation forwarding message. Further, 704 may be performed by determination component 1240 in FIG. 12. At least one of the indication of the at least one conflict or at least one resource reservation forwarding message may trigger the resource reservation forwarding process for the one or more resources, as described in connection with the examples in FIGS. 4-5. For instance, the resource reservation forwarding process may be triggered by the indication or the detection of the at least one conflict. Further, at least one of the indication of the at least one conflict or the indication of the one or more resources may be associated with an acknowledgement (ACK) or a negative ACK (NACK), as described in connection with the examples in FIGS. 4-5.

In some aspects, a set of resources for at least one of the indication of the at least one conflict or the indication of the one or more resources may be mapped to at least one transmission, as described in connection with the examples in FIGS. 4-5. Also, at least one resource reservation forwarding message of the resource reservation forwarding process may be transmitted, as described in connection with the examples in FIGS. 4-5. Further, at least one of the indication of the at least one conflict or the at least one resource reservation forwarding message may be transmitted via one of sidelink control information (SCI), a physical sidelink feedback channel (PSFCH), a physical sidelink shared channel (PSSCH), or a medium access control (MAC) control element (MAC-CE), as described in connection with the examples in FIGS. 4-5.

At 706, the apparatus may transmit, after detecting the at least one conflict in the set of reserved resources, one or more of an indication of the at least one conflict or at least one resource reservation forwarding message of a resource reservation forwarding process, as described in connection with the examples in FIGS. 4-5. For example, as described in 516 of FIG. 5, UE 510 may transmit, upon detecting the at least one conflict in the set of reserved resources, at least one of an indication of the at least one conflict or at least one resource reservation forwarding message. Further, 706 may be performed by determination component 1240 in FIG. 12. For instance, the apparatus may transmit the indications to multiple UEs, as described in connection with the examples in FIGS. 4-5. The resource reservation forwarding process may be triggered by the detection of the at least one conflict in the set of reserved resources, or the resource reservation forwarding process may be triggered by the transmission of the one or more of the at least one resource reservation forwarding message or the indication of the at least one conflict. Also, the resource reservation forwarding process may be triggered if a number of post-collision messages or half-duplex messages received over a time period is greater than a threshold, or the resource reservation forwarding process may be canceled if the number of the post-collision messages or the half-duplex messages received over the time period is less than the threshold.

Figure 8:
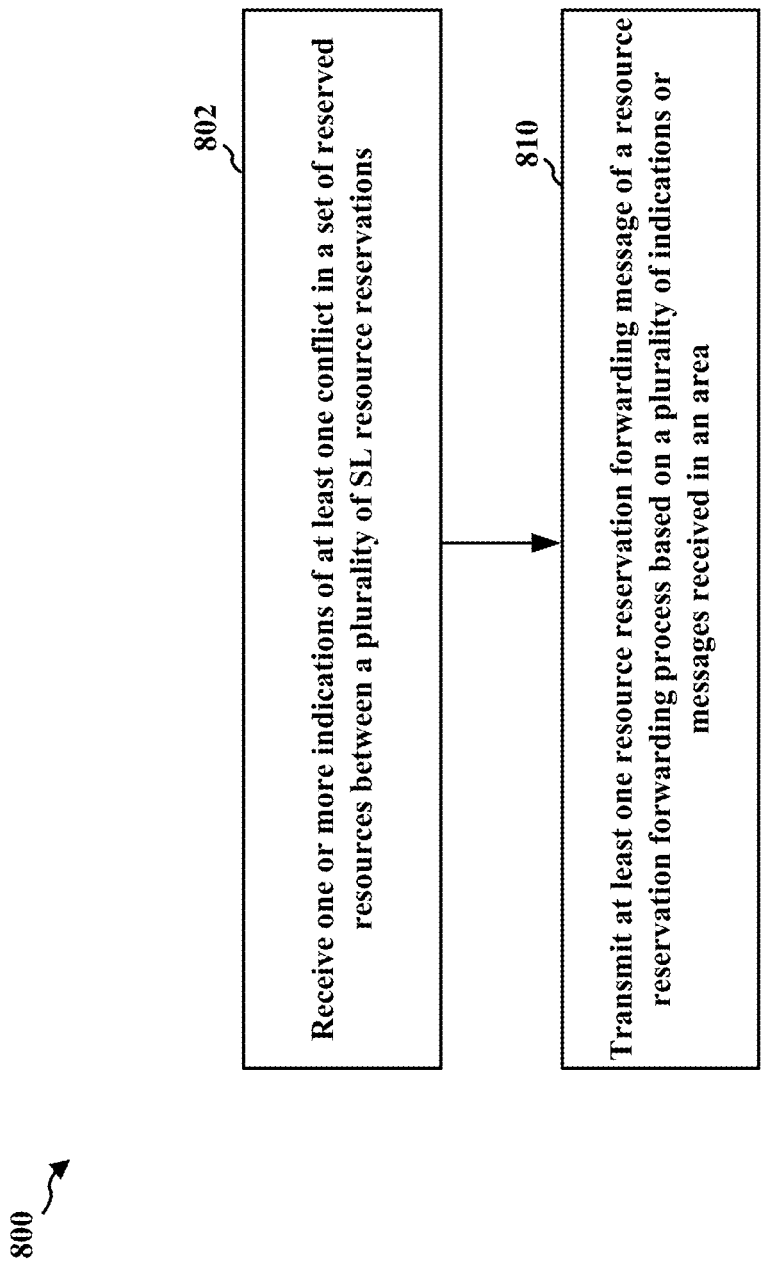
FIG. 8 is a flowchart of a method of wireless communication.

FIG. 8 is a flowchart 800 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 802, the apparatus may receive, from at least one second UE, one or more indications of at least one conflict in a set of reserved resources between a plurality of sidelink (SL) resource reservations, each of the plurality of SL resource reservations being associated with a respective UE of a plurality of UEs, as described in connection with the examples in FIGS. 4-5. For example, as described in 522 of FIG. 5, UE 520 may receive one or more indications of at least one conflict in a set of reserved resources between a plurality of sidelink (SL) resource reservations, each of the plurality of SL resource reservations being associated with one of a plurality of UEs. Further, 802 may be performed by determination component 1340 in FIG. 13.

In some aspects, the one or more indications of the at least one conflict or the indication of the one or more resources may trigger the resource reservation forwarding process for the one or more resources or may cancel the resource reservation forwarding process for the one or more resources, as described in connection with the examples in FIGS. 4-5. Further, the one or more indications of the at least one conflict or the indication of the one or more resources may be received via one of sidelink control information (SCI), a physical sidelink feedback channel (PSFCH), a physical sidelink shared channel (PSSCH), or a medium access control (MAC) control element (MAC-CE), as described in connection with the examples in FIGS. 4-5. The at least one conflict may include at least one of a conflict in time or a conflict in time and frequency, as described in connection with the examples in FIGS. 4-5. Also, the at least one conflict may correspond to a previous collision in the set of reserved resources, a previous half-duplex collision in the set of reserved resources, or a subsequent collision in the set of reserved resources, as described in connection with the examples in FIGS. 4-5.

Additionally, the apparatus may determine, based on a plurality of indications or messages received in an area, whether to transmit at least one resource reservation forwarding message of the resource reservation forwarding process, as described in connection with the examples in FIGS. 4-5. For example, as described in 524 of FIG. 5, UE 520 may determine, based on a plurality of indications or messages received in an area, whether to transmit at least one resource reservation forwarding message of the resource reservation forwarding process. Further, the determination may be performed by determination component 1340 in FIG. 13. The at least one resource reservation forwarding message may be at least one inter-UE coordination message. Further, the at least one resource reservation forwarding message (e.g., an inter-UE coordination message) may be a type of SL transmission, as described in connection with the examples in FIGS. 4-5.

The apparatus may also calculate an amount of the plurality of indications or messages received in the area, as described in connection with the examples in FIGS. 4-5. For example, as described in 526 of FIG. 5, UE 520 may calculate an amount of the plurality of indications or messages received in the area. Further, the calculation may be performed by determination component 1340 in FIG. 13. The at least one resource reservation forwarding message may be transmitted if the amount of the plurality of indications or messages received over a first time period is greater than a first threshold, as described in connection with the examples in FIGS. 4-5. Also, the at least one resource reservation forwarding message may not be transmitted if the amount of the plurality of indications or messages received over a second time period is less than a second threshold, as described in connection with the examples in FIGS. 4-5. The amount of the plurality of indications or messages may also be calculated based on transmission location information for each of the plurality of indications or messages, as described in connection with the examples in FIGS. 4-5.

Further, the apparatus may measure a reference signal received power (RSRP) of each of the plurality of indications or messages received within the area, as described in connection with the examples in FIGS. 4-5. For example, as described in 528 of FIG. 5, UE 520 may measure a reference signal received power (RSRP) of each of the plurality of indications or messages received within the area. Further, the measurement may be performed by determination component 1340 in FIG. 13. The calculated amount of the plurality of indications or messages may include each of the plurality of indications or messages with a RSRP greater than a threshold, as described in connection with the examples in FIGS. 4-5.

At 810, the apparatus may transmit at least one resource reservation forwarding message of the resource reservation forwarding process based on a plurality of indications or messages received in an area, the plurality of indications or messages including the one or more indications of the at least one conflict, as described in connection with the examples in FIGS. 4-5. For example, as described in 530 of FIG. 5, UE 520 may transmit at least one resource reservation forwarding message of the resource reservation forwarding process based on a plurality of indications or messages received in an area. Further, 810 may be performed by determination component 1340 in FIG. 13.

Also, the apparatus may cancel, upon determining to not transmit the at least one resource reservation forwarding message, a transmission of the at least one resource reservation forwarding message, as described in connection with the examples in FIGS. 4-5. For example, as described in 532 of FIG. 5, UE 520 may cancel, upon determining to not transmit the at least one resource reservation forwarding message, a transmission of the at least one resource reservation forwarding message. Further, the cancelation may be performed by determination component 1340 in FIG. 13.

Figure 9:
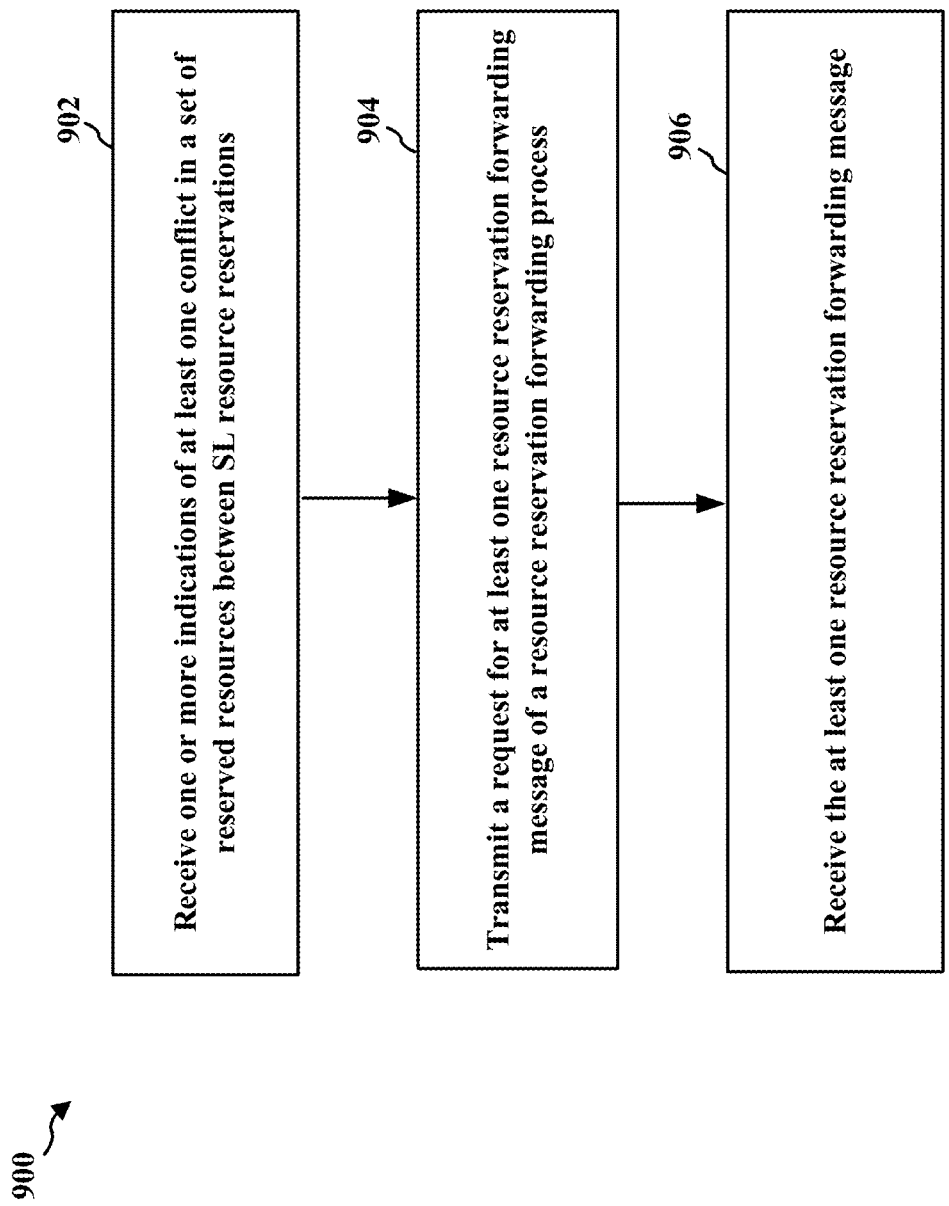
FIG. 9 is a flowchart of a method of wireless communication.

FIG. 9 is a flowchart 900 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 902, the apparatus may receive, from at least one second UE, one or more indications of at least one conflict in a set of reserved resources between a plurality of sidelink (SL) resource reservations, each of the plurality of SL resource reservations being associated with a respective UE of a plurality of UEs, as described in connection with the examples in FIGS. 4-5. For example, as described in 542 of FIG. 5, UE 540 may receive one or more indications of at least one conflict in a set of reserved resources between a plurality of sidelink (SL) resource reservations, each of the plurality of SL resource reservations being associated with one of a plurality of UEs. Further, 902 may be performed by determination component 1340 in FIG. 13.

The one or more indications of the at least one conflict or the indication of the one or more resources may be received via one of sidelink control information (SCI), a physical sidelink feedback channel (PSFCH), a physical sidelink shared channel (PSSCH), or a medium access control (MAC) control element (MAC-CE), as described in connection with the examples in FIGS. 4-5. The at least one conflict may correspond to a first collision in the set of reserved resources, a first half-duplex collision in the set of reserved resources, or a second collision in the set of reserved resources, where the first collision in the set of reserved resources occurs before the second collision in the set of reserved resources, as described in connection with the examples in FIGS. 4-5. Also, the at least one conflict may include at least one of a conflict in time or a conflict in time and frequency, as described in connection with the examples in FIGS. 4-5.

At 904, the apparatus may transmit, to at least one second UE, a request for at least one resource reservation forwarding message of the resource reservation forwarding process, the request indicating to the at least one second UE to transmit the at least one resource reservation forwarding message, as described in connection with the examples in FIGS. 4-5. For example, as described in 544 of FIG. 5, UE 540 may transmit, to at least one second UE, a request for at least one resource reservation forwarding message of the resource reservation forwarding process, the request indicating to the at least one second UE to transmit the at least one resource reservation forwarding message. Further, 904 may be performed by determination component 1340 in FIG. 13.

The request may trigger a subsequent transmission of the at least one resource reservation forwarding message or cancel the subsequent transmission of the at least one resource reservation forwarding message, as described in connection with the examples in FIGS. 4-5. Further, a second transmission of the at least one resource reservation forwarding message may be triggered by the request, or the second transmission of the at least one resource reservation forwarding message may be canceled by the request. Also, the request may adjust a duration when the at least one second UE transmits the at least one resource reservation forwarding message, as described in connection with the examples in FIGS. 4-5. The request may include a transmission configuration, where the at least one resource reservation forwarding message is received based on the transmission configuration of the request, as described in connection with the examples in FIGS. 4-5.

In some instances, the request may be periodically transmitted to the at least one second UE based on a time period, as described in connection with the examples in FIGS. 4-5. The at least one resource reservation forwarding message may be received based on an expiration of the time period, as described in connection with the examples in FIGS. 4-5. Further, the request may be transmitted to the at least one second UE based on priority of SL transmission traffic, as described in connection with the examples in FIGS. 4-5. The request may be based on the one or more indications of the at least one conflict, as described in connection with the examples in FIGS. 4-5.

At 906, the apparatus may receive, based on the transmitted request, the at least one resource reservation forwarding message, as described in connection with the examples in FIGS. 4-5. For example, as described in 546 of FIG. 5, UE 540 may receive, based on the transmitted request, the at least one resource reservation forwarding message. Further, 906 may be performed by determination component 1340 in FIG. 13. The at least one resource reservation forwarding message may be received based on a detection of at least one hidden node, as described in connection with the examples in FIGS. 4-5. Further, the at least one resource reservation forwarding message may be received via one of sidelink control information (SCI), a physical sidelink feedback channel (PSFCH), a physical sidelink shared channel (PSSCH), or a medium access control (MAC) control element (MAC-CE). Also, the request may configure the at least one second UE to transmit the at least one resource reservation forwarding message, as described in connection with the examples in FIGS. 4-5. The at least one resource reservation forwarding message may also be associated with at least one inter-UE coordination message or at least one subsequent SL transmission, as described in connection with the examples in FIGS. 4-5. Moreover, the at least one resource reservation forwarding message may be received via the one or more resources, as described in connection with the examples in FIGS. 4-5.

Figure 10:
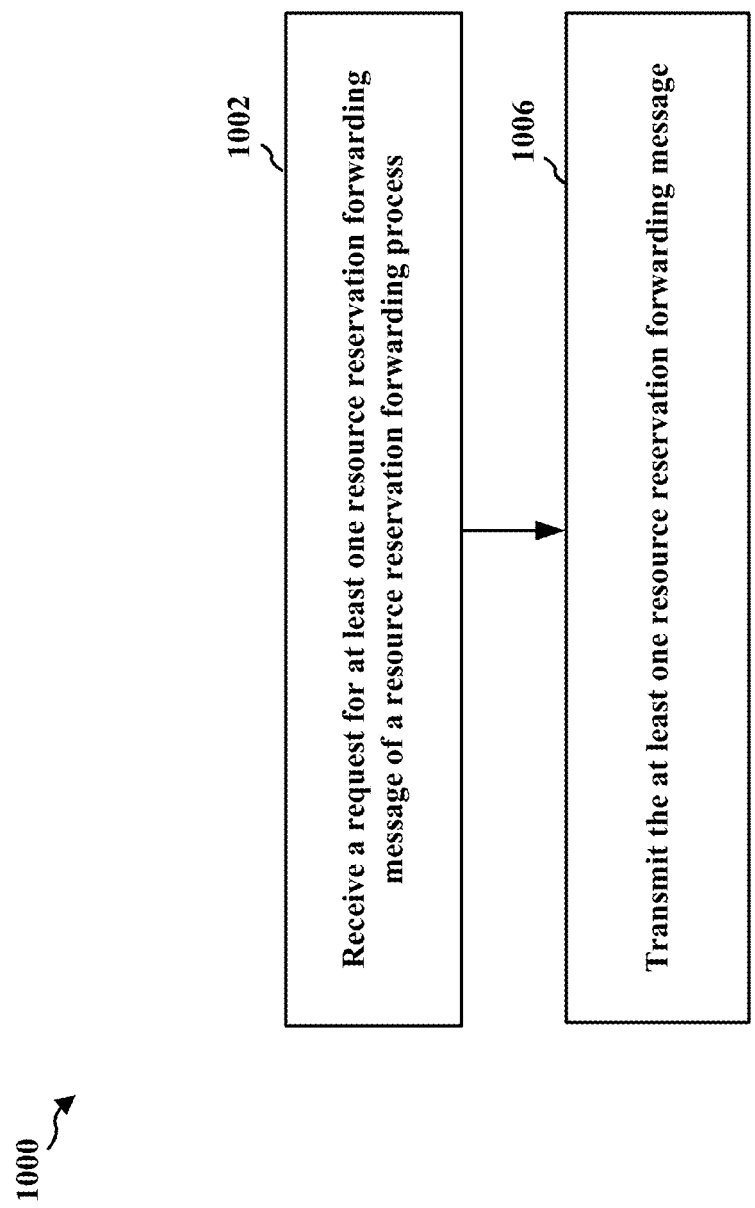
FIG. 10 is a flowchart of a method of wireless communication.

FIG. 10 is a flowchart 1000 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 1002, the apparatus may receive a request for at least one resource reservation forwarding message of a resource reservation forwarding process for one or more resources, the request indicating to transmit the at least one resource reservation forwarding message, as described in connection with the examples in FIGS. 4-5. For example, as described in 562 of FIG. 5, UE 560 may receive a request for at least one resource reservation forwarding message of a resource reservation forwarding process for one or more resources, the request indicating to transmit the at least one resource reservation forwarding message. Further, 1002 may be performed by determination component 1240 in FIG. 12.

In some instances, the request may trigger a subsequent transmission of the at least one resource reservation forwarding message or may cancel the subsequent transmission of the at least one resource reservation forwarding message, as described in connection with the examples in FIGS. 4-5. Further, a second transmission of the at least one resource reservation forwarding message may be triggered by the request, or the second transmission of the at least one resource reservation forwarding message may be canceled by the request. The request may also adjust a duration when the at least one resource reservation forwarding message is transmitted, as described in connection with the examples in FIGS. 4-5. Further, the request may include a transmission configuration, where the determination whether to transmit the at least one resource reservation forwarding message is based on the transmission configuration of the request, as described in connection with the examples in FIGS. 4-5.

In some aspects, the request may be based on at least one of an indication of at least one conflict in a set of reserved resources between a plurality of sidelink (SL) resource reservations, each of the plurality of SL resource reservations being associated with one of a plurality of UEs, as described in connection with the examples in FIGS. 4-5. The at least one conflict may correspond to a previous collision in the set of reserved resources, a previous half-duplex collision in the set of reserved resources, or a subsequent collision in the set of reserved resources, as described in connection with the examples in FIGS. 4-5. The at least one conflict may include at least one of a conflict in time or a conflict in time and frequency, as described in connection with the examples in FIGS. 4-5.

Also, the apparatus may determine, based on the request, whether to transmit the at least one resource reservation forwarding message, as described in connection with the examples in FIGS. 4-5. For example, as described in 564 of FIG. 5, UE 560 may determine, based on the request, whether to transmit the at least one resource reservation forwarding message. Further, the determination may be performed by determination component 1240 in FIG. 12. The at least one resource reservation forwarding message may be transmitted based on an expiration of a time period, as described in connection with the examples in FIGS. 4-5. Also, the at least one resource reservation forwarding message may be transmitted based on a priority of sidelink (SL) transmission traffic, as described in connection with the examples in FIGS. 4-5. The at least one resource reservation forwarding message may be transmitted based on a periodic reception of the request over a time period, as described in connection with the examples in FIGS. 4-5. Also, the request may include a transmission configuration, where the at least one resource reservation forwarding message may be transmitted based on the transmission configuration of the request, as described in connection with the examples in FIGS. 4-5.

At 1006, the apparatus may transmit, based on the request, the at least one resource reservation forwarding message of the resource reservation forwarding process, as described in connection with the examples in FIGS. 4-5. For example, as described in 566 of FIG. 5, UE 560 may transmit the at least one resource reservation forwarding message of the resource reservation forwarding process. Further, 1006 may be performed by determination component 1240 in FIG. 12. The at least one resource reservation forwarding message may be transmitted based on a detection of at least one hidden node, as described in connection with the examples in FIGS. 4-5. Also, the at least one resource reservation forwarding message may be associated with at least one inter-UE coordination message or at least one subsequent SL transmission, as described in connection with the examples in FIGS. 4-5.

Figure 11:
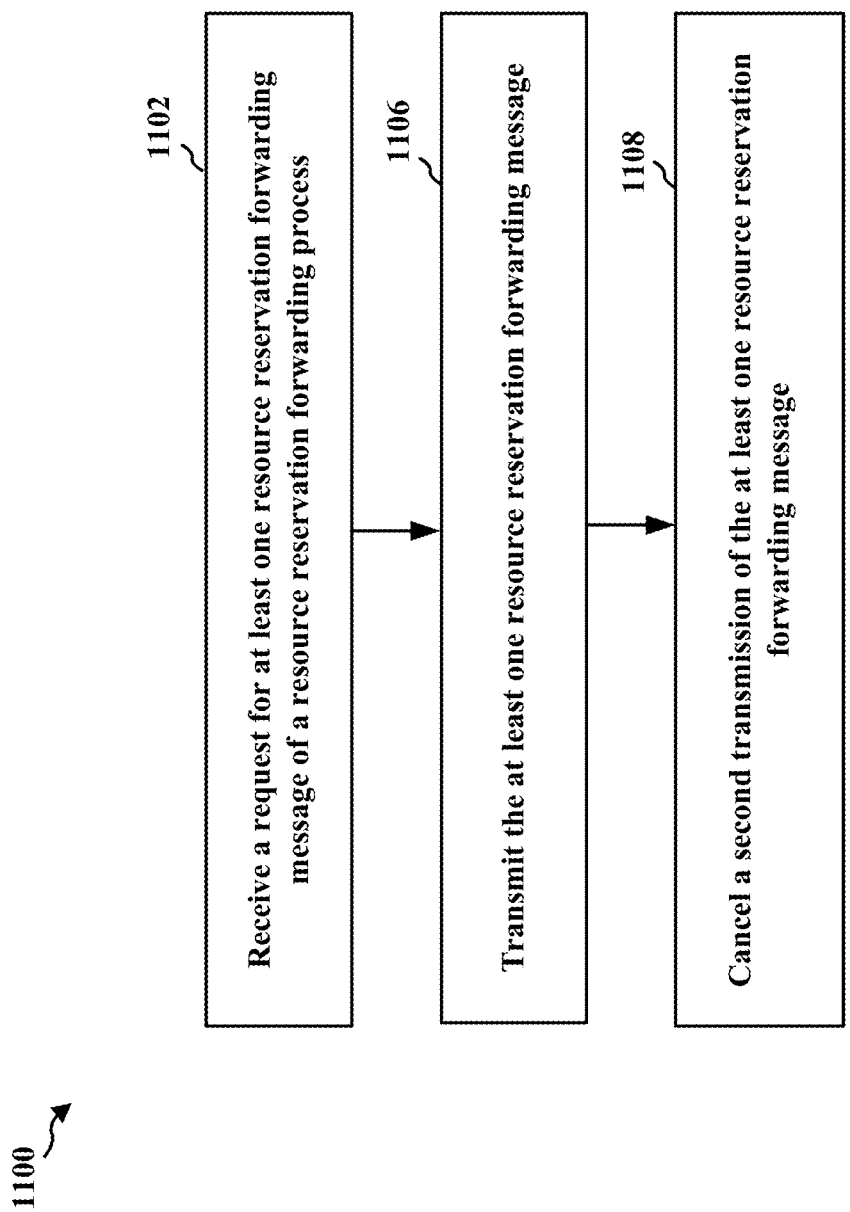
FIG. 11 is a flowchart of a method of wireless communication.

FIG. 11 is a flowchart 1100 of a method of wireless communication. The method may be performed by an apparatus, such as a UE or a component of a UE (e.g., the UE 104, 350, 402/404/406; apparatus 1202, 1302). The methods described herein may provide a number of benefits, such as improving communication signaling, resource utilization, and/or power savings.

At 1102, the apparatus may receive a request for at least one resource reservation forwarding message of a resource reservation forwarding process for one or more resources, the request indicating to transmit the at least one resource reservation forwarding message, as described in connection with the examples in FIGS. 4-5. For example, as described in 562 of FIG. 5, UE 560 may receive a request for at least one resource reservation forwarding message of a resource reservation forwarding process for one or more resources, the request indicating to transmit the at least one resource reservation forwarding message. Further, 1102 may be performed by determination component 1240 in FIG. 12.

In some instances, the request may trigger a subsequent transmission of the at least one resource reservation forwarding message or may cancel the subsequent transmission of the at least one resource reservation forwarding message, as described in connection with the examples in FIGS. 4-5. Further, a second transmission of the at least one resource reservation forwarding message may be triggered by the request, or the second transmission of the at least one resource reservation forwarding message may be canceled by the request. The request may also adjust a duration when the at least one resource reservation forwarding message is transmitted, as described in connection with the examples in FIGS. 4-5. Further, the request may include a transmission configuration, where the determination whether to transmit the at least one resource reservation forwarding message is based on the transmission configuration of the request, as described in connection with the examples in FIGS. 4-5.

In some aspects, the request may be based on at least one of an indication of at least one conflict in a set of reserved resources between a plurality of sidelink (SL) resource reservations, each of the plurality of SL resource reservations being associated with one of a plurality of UEs, as described in connection with the examples in FIGS. 4-5. The at least one conflict may correspond to a previous collision in the set of reserved resources, a previous half-duplex collision in the set of reserved resources, or a subsequent collision in the set of reserved resources, as described in connection with the examples in FIGS. 4-5. The at least one conflict may include at least one of a conflict in time or a conflict in time and frequency, as described in connection with the examples in FIGS. 4-5.

Also, the apparatus may determine, based on the request, whether to transmit the at least one resource reservation forwarding message, as described in connection with the examples in FIGS. 4-5. For example, as described in 564 of FIG. 5, UE 560 may determine, based on the request, whether to transmit the at least one resource reservation forwarding message. Further, the determination may be performed by determination component 1240 in FIG. 12. The at least one resource reservation forwarding message may be transmitted based on an expiration of a time period, as described in connection with the examples in FIGS. 4-5. Also, the at least one resource reservation forwarding message may be transmitted based on a priority of sidelink (SL) transmission traffic, as described in connection with the examples in FIGS. 4-5. The at least one resource reservation forwarding message may be transmitted based on a periodic reception of the request over a time period, as described in connection with the examples in FIGS. 4-5. Also, the request may include a transmission configuration, where the at least one resource reservation forwarding message may be transmitted based on the transmission configuration of the request, as described in connection with the examples in FIGS. 4-5.

At 1106, the apparatus may transmit, based on the request, the at least one resource reservation forwarding message of the resource reservation forwarding process, as described in connection with the examples in FIGS. 4-5. For example, as described in 566 of FIG. 5, UE 560 may transmit the at least one resource reservation forwarding message of the resource reservation forwarding process. Further, 1106 may be performed by determination component 1240 in FIG. 12. The at least one resource reservation forwarding message may be transmitted based on a detection of at least one hidden node, as described in connection with the examples in FIGS. 4-5.

Also, the at least one resource reservation forwarding message may be associated with at least one inter-UE coordination message or at least one subsequent SL transmission, as described in connection with the examples in FIGS. 4-5.

At 1108, the apparatus may cancel a second transmission of the at least one resource reservation forwarding message for the one or more resources, where the at least one resource reservation forwarding message may be transmitted before the second transmission of the at least one resource reservation forwarding message is canceled, as described in connection with the examples in FIGS. 4-5. For example, as described in 568 of FIG. 5, UE 560 may cancel a subsequent transmission of the at least one resource reservation forwarding message for the one or more resources. Further, 1108 may be performed by determination component 1240 in FIG. 12.

Figure 12:
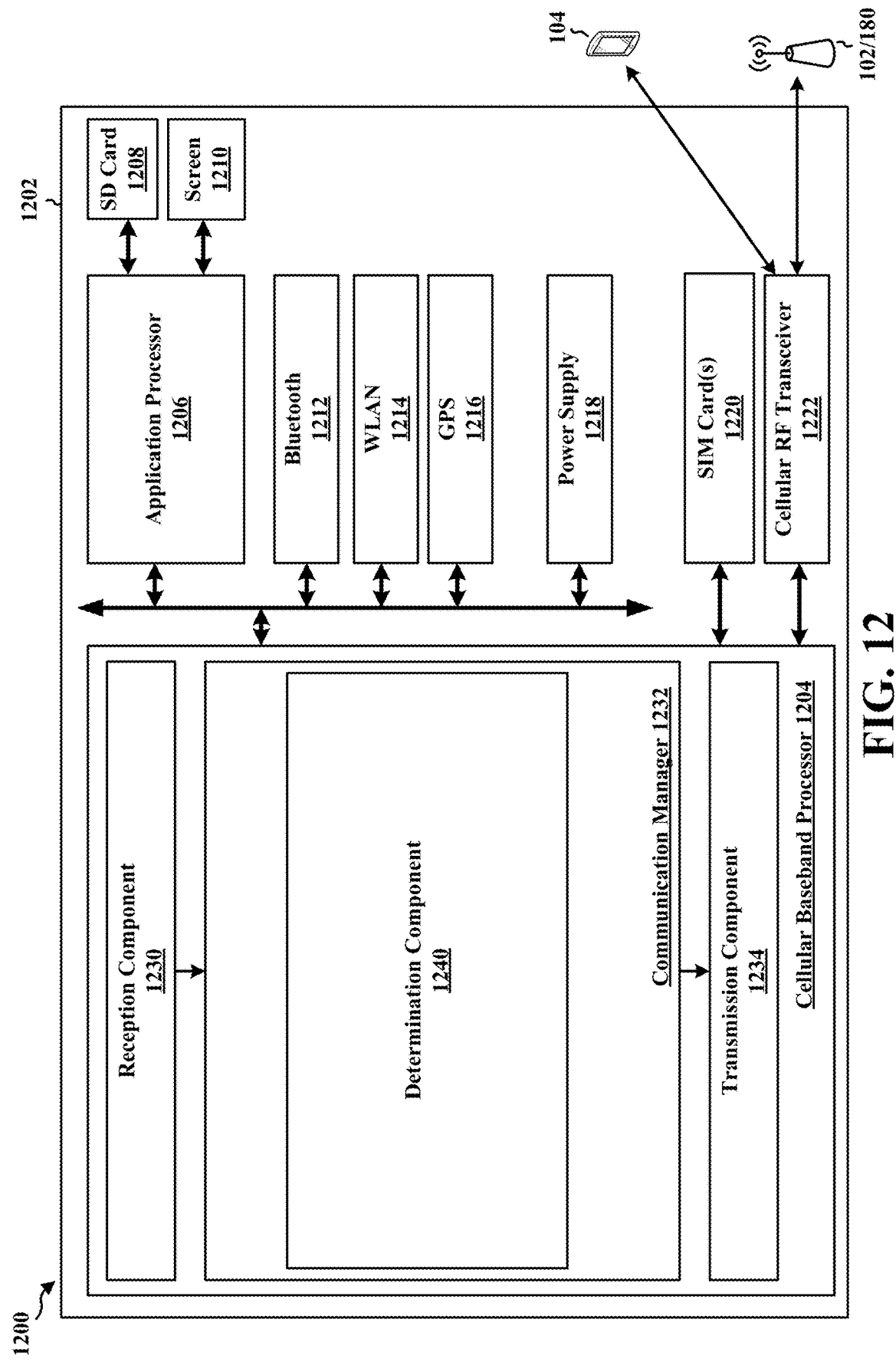
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that may be configured to detect at least one conflict in a set of reserved resources between a plurality of sidelink (SL) resource reservations, each of the plurality of SL resource reservations being associated with one of a plurality of UEs, e.g., as described in connection with 702 in FIG. 7. Determination component 1240 may also be configured to configure at least one of the indication of the at least one conflict or at least one resource reservation forwarding message, e.g., as described in connection with 704 in FIG. 7. Determination component 1240 may also be configured to transmit, upon detecting the at least one conflict in the set of reserved resources, at least one of an indication of the at least one conflict or at least one resource reservation forwarding message, e.g., as described in connection with 706 in FIG. 7.

Determination component 1240 may also be configured to receive a request for at least one resource reservation forwarding message of a resource reservation forwarding process for one or more resources, the request indicating to transmit the at least one resource reservation forwarding message, e.g., as described in connection with 1102 in FIG. 11. Determination component 1240 may also be configured to determine, based on the request, whether to transmit the at least one resource reservation forwarding message. Determination component 1240 may also be configured to transmit, upon determining to transmit the at least one resource reservation forwarding message, the at least one resource reservation forwarding message, e.g., as described in connection with 1106 in FIG. 11. Determination component 1240 may also be configured to cancel, upon determining to not transmit the at least one resource reservation forwarding message, a transmission of the at least one resource reservation forwarding message for the one or more resources, e.g., as described in connection with 1108 in FIG. 11.

The apparatus may include additional components that perform each of the blocks of the algorithm in the aforementioned flowcharts of FIGS. 5, 6, 7, 10, and 11. As such, each block in the aforementioned flowcharts of FIGS. 5, 6, 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for detecting at least one conflict in a set of reserved resources between a plurality of sidelink (SL) resource reservations, each of the plurality of SL resource reservations being associated with one of a plurality of UEs; means for configuring at least one of the indication of the at least one conflict or at least one resource reservation forwarding message; means for transmitting, upon detecting the at least one conflict in the set of reserved resources, at least one of an indication of the at least one conflict or at least one resource reservation forwarding message; means for receiving a request for at least one resource reservation forwarding message of a resource reservation forwarding process for one or more resources, the request indicating to transmit the at least one resource reservation forwarding message; means for determining, based on the request, whether to transmit the at least one resource reservation forwarding message; means for transmitting, upon determining to transmit the at least one resource reservation forwarding message, the at least one resource reservation forwarding message; and means for canceling, upon determining to not transmit the at least one resource reservation forwarding message, a transmission of the at least one resource reservation forwarding message for the one or more resources. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
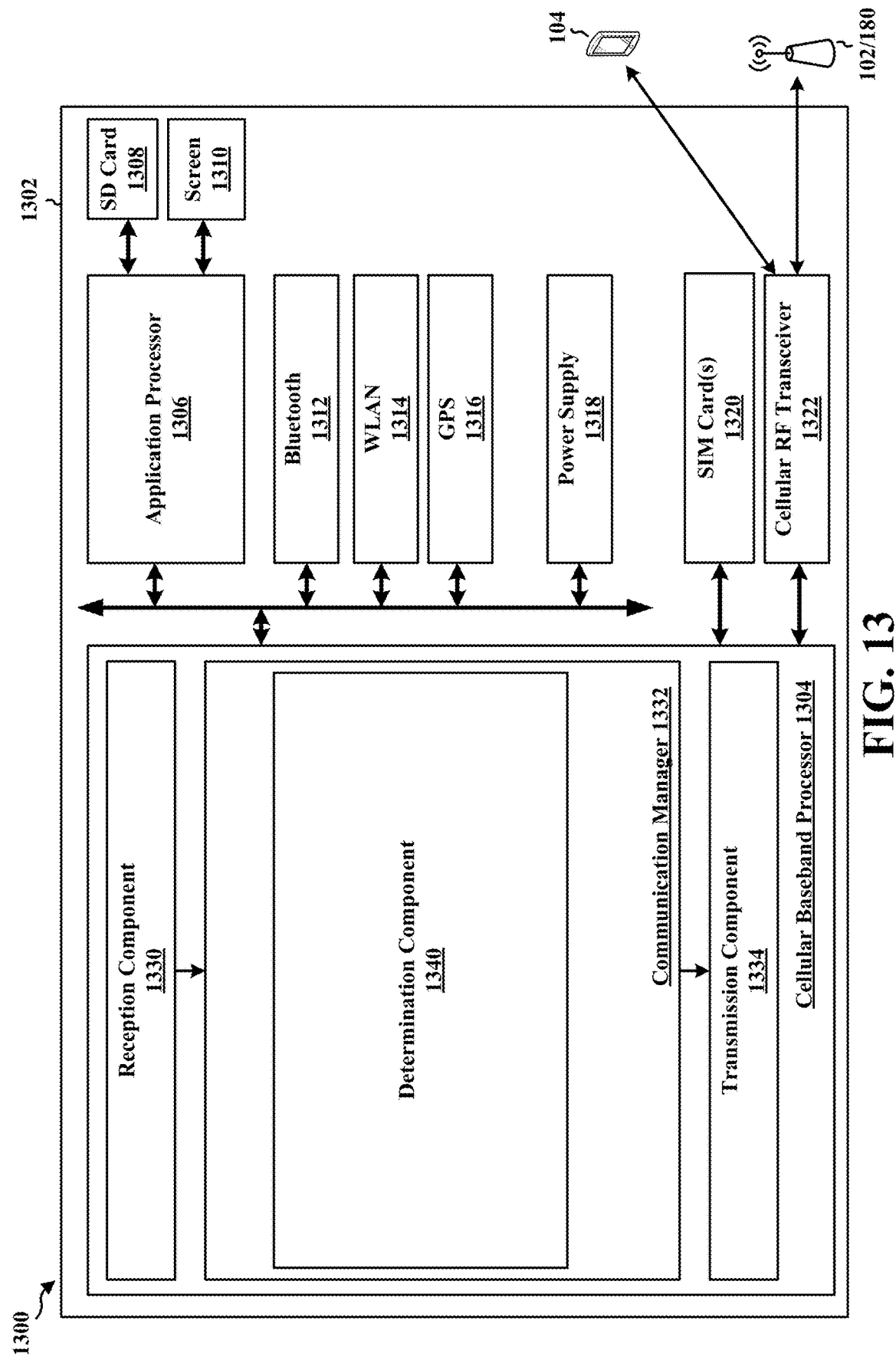
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a determination component 1340 that may be configured to receive one or more indications of at least one conflict in a set of reserved resources between a plurality of sidelink (SL) resource reservations, each of the plurality of SL resource reservations being associated with one of a plurality of UEs, e.g., as described in connection with 802 in FIG. 8. Determination component 1340 may also be configured to determine, based on a plurality of indications or messages received in an area, whether to transmit at least one resource reservation forwarding message of the resource reservation forwarding process, the plurality of indications or messages including one or more indications of the at least one conflict. Determination component 1340 may also be configured to calculate an amount of the plurality of indications or messages received in the area. Determination component 1340 may also be configured to measure a reference signal received power (RSRP) of each of the plurality of indications or messages received within the area. Determination component 1340 may also be configured to transmit, upon determining to transmit the at least one resource reservation forwarding message, the at least one resource reservation forwarding message, e.g., as described in connection with 810 in FIG. 8. Determination component 1340 may also be configured to cancel, upon determining to not transmit the at least one resource reservation forwarding message, a transmission of the at least one resource reservation forwarding message.

Determination component 1340 may also be configured to receive one or more indications of at least one conflict in a set of reserved resources between a plurality of sidelink (SL) resource reservations, each of the plurality of SL resource reservations being associated with one of a plurality of UEs, e.g., as described in connection with 902 in FIG. 9. Determination component 1340 may also be configured to transmit, to at least one second UE, a request for at least one resource reservation forwarding message of the resource reservation forwarding process, the request indicating to the at least one second UE to transmit the at least one resource reservation forwarding message, e.g., as described in connection with 904 in FIG. 9. Determination component 1340 may also be configured to receive, based on the transmitted request, the at least one resource reservation forwarding message, e.g., as described in connection with 906 in FIG. 9.

The apparatus may include additional components that perform each of the blocks of the algorithm in the aforementioned flowcharts of FIGS. 5, 8, and 9. As such, each block in the aforementioned flowcharts of FIGS. 5, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving one or more indications of at least one conflict in a set of reserved resources between a plurality of sidelink (SL) resource reservations, each of the plurality of SL resource reservations being associated with one of a plurality of UEs; means for determining, based on a plurality of indications or messages received in an area, whether to transmit at least one resource reservation forwarding message of the resource reservation forwarding process, the plurality of indications or messages including one or more indications of the at least one conflict; means for calculating an amount of the plurality of indications or messages received in the area; means for measuring a reference signal received power (RSRP) of each of the plurality of indications or messages received within the area; means for transmitting, upon determining to transmit the at least one resource reservation forwarding message, the at least one resource reservation forwarding message; means for canceling, upon determining to not transmit the at least one resource reservation forwarding message, a transmission of the at least one resource reservation forwarding message; means for receiving one or more indications of at least one conflict in a set of reserved resources between a plurality of sidelink (SL) resource reservations, each of the plurality of SL resource reservations being associated with one of a plurality of UEs; means for transmitting, to at least one second UE, a request for at least one resource reservation forwarding message of the resource reservation forwarding process, the request indicating to the at least one second UE to transmit the at least one resource reservation forwarding message; and means for receiving, based on the transmitted request, the at least one resource reservation forwarding message. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes detecting at least one conflict in a set of reserved resources between two or more sidelink (SL) transmissions, each of the two or more SL transmissions being associated with each of two or more UEs; and transmitting, upon detecting the at least one conflict in the set of reserved resources, at least one of an indication of the at least one conflict or an indication of one or more resources for a resource reservation forwarding process.

Aspect 2 is the method of aspect 1, where the at least one conflict corresponds to a previous collision in the set of reserved resources, a previous half-duplex collision in the set of reserved resources, or a subsequent collision in the set of reserved resources.

Aspect 3 is the method of any of aspects 1 and 2, where at least one of the indication of the at least one conflict or the indication of the one or more resources triggers the resource reservation forwarding process for the one or more resources or cancels the resource reservation forwarding process for the one or more resources.

Aspect 4 is the method of any of aspects 1 to 3, where the resource reservation forwarding process for the one or more resources is associated with at least one resource reservation forwarding message, at least one inter-UE coordination message, or at least one subsequent SL transmission.

Aspect 5 is the method of any of aspects 1 to 4, further including configuring at least one of the indication of the at least one conflict or the indication of the one or more resources.

Aspect 6 is the method of any of aspects 1 to 5, where at least one of the indication of the at least one conflict or the indication of the one or more resources is associated with an acknowledgement (ACK) or a negative ACK (NACK).

Aspect 7 is the method of any of aspects 1 to 6, where a set of resources for at least one of the indication of the at least one conflict or the indication of the one or more resources is mapped to at least one transmission.

Aspect 8 is the method of any of aspects 1 to 7, where at least one resource reservation forwarding message of the resource reservation forwarding process is transmitted via the one or more resources in the set of resources for at least one of the indication of the at least one conflict or the indication of the one or more resources.

Aspect 9 is the method of any of aspects 1 to 8, where at least one of the indication of the at least one conflict or the indication of the one or more resources is transmitted via one of sidelink control information (SCI), a physical sidelink feedback channel (PSFCH), a physical sidelink shared channel (PSSCH), or a medium access control (MAC) control element (MAC-CE).

Aspect 10 is the method of any of aspects 1 to 9, where the at least one conflict includes at least one of a conflict in time or a conflict in time and frequency.

Aspect 11 is an apparatus for wireless communication including at least one processor coupled to a memory and configured to implement a method as in any of aspects 1 to 10, further including at least one transceiver coupled to the at least one processor.

Aspect 12 is an apparatus for wireless communication including means for implementing a method as in any of aspects 1 to 10.

Aspect 13 is a computer-readable medium storing computer executable code, where the code when executed by a processor causes the processor to implement a method as in any of aspects 1 to 10.

Aspect 14 is a method of wireless communication of a user equipment (UE). The method includes receiving at least one of an indication of at least one conflict in a set of reserved resources between two or more sidelink (SL) transmissions or an indication of one or more resources for a resource reservation forwarding process, each of the two or more SL transmissions being associated with each of two or more UEs; determining, based on a plurality of indications or messages received in an area, whether to transmit at least one resource reservation forwarding message of the resource reservation forwarding process, the plurality of indications or messages including at least one of the indication of the at least one conflict or the indication of the one or more resources; and transmitting, upon determining to transmit the at least one resource reservation forwarding message, the at least one resource reservation forwarding message.

Aspect 15 is the method of aspect 14, further including calculating an amount of the plurality of indications or messages received in the area.

Aspect 16 is the method of any of aspects 14 and 15, further including measuring a reference signal received power (RSRP) of each of the plurality of indications or messages received within the area.

Aspect 17 is the method of any of aspects 14 to 16, where the calculated amount of the plurality of indications or messages includes each of the plurality of indications or messages with a RSRP greater than a threshold.

Aspect 18 is the method of any of aspects 14 to 17, where the at least one resource reservation forwarding message is transmitted if the amount of the plurality of indications or messages received over a first time period is greater than a first threshold.

Aspect 19 is the method of any of aspects 14 to 18, where the at least one resource reservation forwarding message is not transmitted if the amount of the plurality of indications or messages received over a second time period is less than a second threshold.

Aspect 20 is the method of any of aspects 14 to 19, where the amount of the plurality of indications or messages is calculated based on transmission location information for each of the plurality of indications or messages.

Aspect 21 is the method of any of aspects 14 to 20, further including canceling, upon determining to not transmit the at least one resource reservation forwarding message, a transmission of the at least one resource reservation forwarding message.

Aspect 22 is the method of any of aspects 14 to 21, where at least one of the indication of the at least one conflict or the indication of the one or more resources triggers the resource reservation forwarding process for the one or more resources or cancels the resource reservation forwarding process for the one or more resources.

Aspect 23 is the method of any of aspects 14 to 22, where the at least one resource reservation forwarding message is associated with at least one inter-UE coordination message or at least one subsequent SL transmission.

Aspect 24 is the method of any of aspects 14 to 23, where the at least one conflict corresponds to a previous collision in the set of reserved resources, a previous half-duplex collision in the set of reserved resources, or a subsequent collision in the set of reserved resources.

Aspect 25 is the method of any of aspects 14 to 24, where the at least one resource reservation forwarding message of the resource reservation forwarding process is transmitted via the one or more resources in a set of resources for at least one of the indication of the at least one conflict or the indication of the one or more resources.

Aspect 26 is the method of any of aspects 14 to 25, where at least one of the indication of the at least one conflict or the indication of the one or more resources is received via one of sidelink control information (SCI), a physical sidelink feedback channel (PSFCH), a physical sidelink shared channel (PSSCH), or a medium access control (MAC) control element (MAC-CE).

Aspect 27 is the method of any of aspects 14 to 26, where the at least one conflict includes at least one of a conflict in time or a conflict in time and frequency.

Aspect 28 is an apparatus for wireless communication including at least one processor coupled to a memory and configured to implement a method as in any of aspects 14 to 27, further including at least one transceiver coupled to the at least one processor.

Aspect 29 is an apparatus for wireless communication including means for implementing a method as in any of aspects 14 to 27.

Aspect 30 is a computer-readable medium storing computer executable code, where the code when executed by a processor causes the processor to implement a method as in any of aspects 14 to 27.

Aspect 31 is a method of wireless communication of a user equipment (UE). The method includes receiving at least one of an indication of at least one conflict in a set of reserved resources between two or more sidelink (SL) transmissions or an indication of one or more resources for a resource reservation forwarding process, each of the two or more SL transmissions being associated with each of two or more UEs; transmitting, to at least one second UE, a request for at least one resource reservation forwarding message of the resource reservation forwarding process, the request indicating to the at least one second UE to transmit the at least one resource reservation forwarding message; and receiving, based on the transmitted request, the at least one resource reservation forwarding message.

Aspect 32 is the method of aspect 31, where the request triggers a transmission of the at least one resource reservation forwarding message or cancels the transmission of the at least one resource reservation forwarding message.

Aspect 33 is the method of any of aspects 31 and 32, where the request adjusts a duration when the at least one second UE transmits the at least one resource reservation forwarding message.

Aspect 34 is the method of any of aspects 31 to 33, where the request includes a transmission configuration, where the at least one resource reservation forwarding message is received based on the transmission configuration of the request.

Aspect 35 is the method of any of aspects 31 to 34, where the request is periodically transmitted to the at least one second UE based on a time period.

Aspect 36 is the method of any of aspects 31 to 35, where the at least one resource reservation forwarding message is received based on an expiration of the time period.

Aspect 37 is the method of any of aspects 31 to 36, where the request is transmitted to the at least one second UE based on priority of SL transmission traffic.

Aspect 38 is the method of any of aspects 31 to 37, where the at least one resource reservation forwarding message is received based on a detection of at least one hidden node.

Aspect 39 is the method of any of aspects 31 to 38, where the request configures the at least one second UE to transmit the at least one resource reservation forwarding message.

Aspect 40 is the method of any of aspects 31 to 39, where the request is based on at least one of the indication of the at least one conflict or the indication of the one or more resources.

Aspect 41 is the method of any of aspects 31 to 40, where the at least one resource reservation forwarding message is associated with at least one inter-UE coordination message or at least one subsequent SL transmission.

Aspect 42 is the method of any of aspects 31 to 41, where the at least one conflict corresponds to a previous collision in the set of reserved resources, a previous half-duplex collision in the set of reserved resources, or a subsequent collision in the set of reserved resources.

Aspect 43 is the method of any of aspects 31 to 42, where the at least one resource reservation forwarding message is received via the one or more resources.

Aspect 44 is the method of any of aspects 31 to 43, where at least one of the indication of the at least one conflict or the indication of the one or more resources is received via one of sidelink control information (SCI), a physical sidelink feedback channel (PSFCH), a physical sidelink shared channel (PSSCH), or a medium access control (MAC) control element (MAC-CE).

Aspect 45 is the method of any of aspects 31 to 44, where the at least one conflict includes at least one of a conflict in time or a conflict in time and frequency.

Aspect 46 is an apparatus for wireless communication including at least one processor coupled to a memory and configured to implement a method as in any of aspects 31 to 45, further including at least one transceiver coupled to the at least one processor.

Aspect 47 is an apparatus for wireless communication including means for implementing a method as in any of aspects 31 to 45.

Aspect 48 is a computer-readable medium storing computer executable code, where the code when executed by a processor causes the processor to implement a method as in any of aspects 31 to 45.

Aspect 49 is a method of wireless communication of a user equipment (UE). The method includes receiving a request for at least one resource reservation forwarding message of a resource reservation forwarding process for one or more resources, the request indicating to transmit the at least one resource reservation forwarding message; determining, based on the request, whether to transmit the at least one resource reservation forwarding message; and transmitting, upon determining to transmit the at least one resource reservation forwarding message, the at least one resource reservation forwarding message.

Aspect 50 is the method of aspect 49, further including canceling, upon determining to not transmit the at least one resource reservation forwarding message, a transmission of the at least one resource reservation forwarding message for the one or more resources.

Aspect 51 is the method of any of aspects 49 and 50, where the request triggers a transmission of the at least one resource reservation forwarding message or cancels the transmission of the at least one resource reservation forwarding message.

Aspect 52 is the method of any of aspects 49 to 51, where the request adjusts a duration when the at least one resource reservation forwarding message is transmitted.

Aspect 53 is the method of any of aspects 49 to 52, where the request includes a transmission configuration, where the determination whether to transmit the at least one resource reservation forwarding message is based on the transmission configuration of the request.

Aspect 54 is the method of any of aspects 49 to 53, where the determination whether to transmit the at least one resource reservation forwarding message is based on an expiration of a time period.

Aspect 55 is the method of any of aspects 49 to 54, where the determination whether to transmit the at least one resource reservation forwarding message is based on a priority of sidelink (SL) transmission traffic.

Aspect 56 is the method of any of aspects 49 to 55, where the determination whether to transmit the at least one resource reservation forwarding message is based on a periodic reception of the request over a time period.

Aspect 57 is the method of any of aspects 49 to 56, where the at least one resource reservation forwarding message is transmitted based on a detection of at least one hidden node.

Aspect 58 is the method of any of aspects 49 to 57, where the at least one resource reservation forwarding message is associated with at least one inter-UE coordination message or at least one subsequent SL transmission.

Aspect 59 is the method of any of aspects 49 to 58, where the at least one resource reservation forwarding message is transmitted via the one or more resources.

Aspect 60 is the method of any of aspects 49 to 59, where the request is based on at least one of an indication of at least one conflict in a set of reserved resources between two or more sidelink (SL) transmissions or an indication of the one or more resources for the resource reservation forwarding process, each of the two or more SL transmissions being associated with each of two or more UEs.

Aspect 61 is the method of any of aspects 49 to 60, where the at least one conflict corresponds to a previous collision in the set of reserved resources, a previous half-duplex collision in the set of reserved resources, or a subsequent collision in the set of reserved resources.

Aspect 62 is the method of any of aspects 49 to 61, where the at least one conflict includes at least one of a conflict in time or a conflict in time and frequency.

Aspect 63 is an apparatus for wireless communication including at least one processor coupled to a memory and configured to implement a method as in any of aspects 49 to 62, further including at least one transceiver coupled to the at least one processor.

Aspect 64 is an apparatus for wireless communication including means for implementing a method as in any of aspects 49 to 62.

Aspect 65 is a computer-readable medium storing computer executable code, where the code when executed by a processor causes the processor to implement a method as in any of aspects 49 to 62.

What is claimed is:

1. A method of wireless communication at a first user equipment (UE), comprising:
    detecting at least one conflict in a set of reserved resources between a plurality of sidelink (SL) resource reservations, each of the plurality of SL resource reservations being associated with a respective UE of a plurality of UEs;
    triggering, based on receiving, during a first time period, a number of post-collision messages or half-duplex messages that is greater than a threshold, a resource reservation forwarding process; and
    transmitting, after detecting the at least one conflict in the set of reserved resources, one or more of at least one resource reservation forwarding message of the resource reservation forwarding process or an indication of the at least one conflict.

2. The method of claim 1, wherein the at least one conflict corresponds to a first collision in the set of reserved resources, a first half-duplex collision in the set of reserved resources, or a second collision in the set of reserved resources, wherein the first collision in the set of reserved resources occurs before the second collision in the set of reserved resources.

3. The method of claim 1, wherein the resource reservation forwarding process is further triggered by the detection of the at least one conflict in the set of reserved resources, or wherein the resource reservation forwarding process is further triggered by the transmission of the one or more of the at least one resource reservation forwarding message or the indication of the at least one conflict.

4. The method of claim 1, wherein the resource reservation forwarding process is associated with at least one inter-UE coordination message or at least one subsequent SL transmission.

5. The method of claim 1, further comprising:
    configuring at least one of the indication of the at least one conflict or the at least one resource reservation forwarding message.

6. The method of claim 1, further comprising:
    canceling the resource reservation forwarding process based on receiving, during a second time period, a different number of the post-collision messages or the half-duplex messages that is less than an additional threshold.

7. The method of claim 1, wherein the one or more of the at least one resource reservation forwarding message or the indication of the at least one conflict is transmitted via one of sidelink control information (SCI), a physical sidelink feedback channel (PSFCH), a physical sidelink shared channel (PSSCH), or a medium access control (MAC) control element (MAC-CE).

8. The method of claim 1, wherein the at least one conflict includes at least one of a first conflict in time or a second conflict in time and frequency.

9. A method of wireless communication at a first user equipment (UE), comprising:
    receiving, from at least one second UE, one or more indications of at least one conflict in a set of reserved resources between a plurality of sidelink (SL) resource reservations, each of the plurality of SL resource reservations being associated with a respective UE of a plurality of UEs;
    triggering, based on receiving, during a first time period, a number of post-collision messages or half-duplex messages that is greater than a threshold, a resource reservation forwarding process; and
    transmitting at least one resource reservation forwarding message of the resource reservation forwarding process based on a plurality of indications or messages received in an area, the plurality of the indications or the messages including the one or more indications of the at least one conflict.

10. A method of wireless communication at a first user equipment (UE), comprising:
    receiving, from at least one second UE, one or more indications of at least one conflict in a set of reserved resources between a plurality of sidelink (SL) resource reservations, each of the plurality of SL resource reservations being associated with a respective UE of a plurality of UEs;
    transmitting, to the at least one second UE, a request for at least one resource reservation forwarding message of a resource reservation forwarding process, the request indicating to the at least one second UE to transmit the at least one resource reservation forwarding message; and receiving, based on the transmitted request, the at least one resource reservation forwarding message.

11. The method of claim 10, wherein a second transmission of the at least one resource reservation forwarding message is triggered by the request.

12. The method of claim 10, wherein the request indicates a time period during which the first UE is requesting the at least one second UE to transmit the at least one resource reservation forwarding message.

13. The method of claim 10, wherein the request includes a transmission configuration, wherein the at least one resource reservation forwarding message is received based on the transmission configuration of the request.

14. The method of claim 10, wherein the request is periodically transmitted to the at least one second UE based on a time period.

15. The method of claim 10, wherein the request is transmitted to the at least one second UE based on a priority of SL transmission traffic.

16. The method of claim 10, wherein the request is transmitted to the at least one second UE based on a detection of at least one hidden node.

17. The method of claim 10, wherein the request is based on the one or more indications of the at least one conflict.

18. The method of claim 10, wherein the at least one resource reservation forwarding message is associated with at least one inter-UE coordination message or at least one subsequent SL transmission.

19. The method of claim 10, wherein the at least one conflict corresponds to a first collision in the set of reserved resources, a first half-duplex collision in the set of reserved resources, or a second collision in the set of reserved resources, wherein the first collision in the set of reserved resources occurs before the second collision in the set of reserved resources.

20. The method of claim 10, wherein the at least one resource reservation forwarding message is received via one of sidelink control information (SCI), a physical sidelink feedback channel (PSFCH), a physical sidelink shared channel (PSSCH), or a medium access control (MAC) control element (MAC-CE).

21. A method of wireless communication at a first user equipment (UE), comprising:
receiving, from a second UE, a request for at least one resource reservation forwarding message of a resource reservation forwarding process, the request indicating to transmit the at least one resource reservation forwarding message; and
transmitting, to the second UE based on the request, the at least one resource reservation forwarding message of the resource reservation forwarding process.

22. The method of claim 21, further comprising:
canceling a second transmission of the at least one resource reservation forwarding message for the one or more resources, wherein the at least one resource reservation forwarding message is transmitted before the second transmission of the at least one resource reservation forwarding message is canceled.

23. The method of claim 21, wherein a second transmission of the at least one resource reservation forwarding message is triggered by the request.

24. The method of claim 21, wherein the request indicates a time period during which the second UE is requesting the at least one resource reservation forwarding message.

25. The method of claim 21, wherein the request includes a transmission configuration, wherein the at least one resource reservation forwarding message is transmitted based on the transmission configuration of the request.

26. The method of claim 1, wherein transmitting the one or more of the at least one resource reservation forwarding message of the resource reservation forwarding process or the indication of the at least one conflict comprises transmitting the at least one resource reservation forwarding message, wherein the at least one resource reservation forwarding message comprises information regarding resources reserved by a SL resource reservation in the plurality of SL resource reservations.

27. The method of claim 6, wherein the threshold is a first threshold number of the post-collision messages or the half-duplex messages wherein the additional threshold is a second threshold number of the post-collision messages or the half-duplex messages, and wherein the second threshold number is less than the first threshold number.

28. An apparatus for wireless communication at a first user equipment (UE), comprising:
memory; and
one or more processors coupled to the memory and, based at least in part on information stored in the memory, the one or more processors configured to:
detect at least one conflict in a set of reserved resources between a plurality of sidelink (SL) resource reservations, each of the plurality of SL resource reservations being associated with a respective UE of a plurality of UEs, trigger, during a first time period and based on a number of received post-collision messages or half-duplex messages during the first time period that is greater than a threshold, a resource reservation forwarding process, and transmit, after detection of the at least one conflict in the set of reserved resources, one or more of at least one resource reservation forwarding message of the resource reservation forwarding process or an indication of the at least one conflict;
receive, from at least one second UE, one or more indications of the at least one conflict in the set of reserved resources between the plurality of SL resource reservations, each of the plurality of SL resource reservations being associated with the respective UE of the plurality of UEs, trigger, during the first time period and based on the number of received post-collision messages or the half-duplex messages during the first time period that is greater than the threshold, the resource reservation forwarding process, and transmit the at least one resource reservation forwarding message of the resource reservation forwarding process based on a plurality of the indications or the messages received in an area, the plurality of indications or messages including the one or more indications of the at least one conflict;
receive, from the at least one second UE, the one or more indications of the at least one conflict in the set of reserved resources between the plurality of SL resource reservations, each of the plurality of SL resource reservations being associated with the respective UE of the plurality of UEs, transmit, to the at least one second UE, a request for the at least one resource reservation forwarding message of the resource reservation forwarding process, the request indicating to the at least one second UE to transmit the at least one resource reservation forwarding message, and receive, based on the transmitted request, the at least one resource reservation forwarding message; or receive the request for the at least one resource reservation forwarding message of the resource reservation forwarding process, the request indicating to transmit the at least one resource reservation forwarding message and transmit, based on the request, the at least one resource reservation forwarding message of the resource reservation forwarding process.

29. The method of claim 9, wherein the at least one conflict corresponds to a first collision in the set of reserved resources, a first half-duplex collision in the set of reserved resources, or a second collision in the set of reserved resources, wherein the first collision in the set of reserved resources occurs before the second collision in the set of reserved resources.

30. The method of claim 9, wherein the resource reservation forwarding process is further triggered by the receiving the one or more indications of the at least one conflict in the set of reserved resources.

31. The method of claim 9, wherein the resource reservation forwarding process is associated with at least one inter-UE coordination message or at least one subsequent SL transmission.

32. The method of claim 9, further comprising:
canceling the resource reservation forwarding process based on receiving, during a second time period, a different number of the post-collision messages or the half-duplex messages that is less than an additional threshold.

33. The method of claim 32, wherein the threshold is a first threshold number of the post-collision messages or the half-duplex messages, wherein the additional threshold is a second threshold number of the post-collision messages or the half-duplex messages, and wherein the second threshold number is less than the first threshold number.

\* \* \* \* \*